US007969650B2

(12) United States Patent
Marks et al.

(10) Patent No.: US 7,969,650 B2
(45) Date of Patent: Jun. 28, 2011

(54) MULTIPLEX NEAR-FIELD MICROSCOPY WITH DIFFRACTIVE ELEMENTS

(75) Inventors: Daniel L. Marks, Urbana, IL (US); Paul Scott Carney, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 440 days.

(21) Appl. No.: 11/413,633

(22) Filed: Apr. 28, 2006

(65) Prior Publication Data
US 2007/0013999 A1 Jan. 18, 2007

Related U.S. Application Data

(60) Provisional application No. 60/675,838, filed on Apr. 28, 2005.

(51) Int. Cl.
*G02B 21/06* (2006.01)
(52) U.S. Cl. .......................... 359/368; 359/363
(58) Field of Classification Search ...... 5/368; 359/368, 359/363
See application file for complete search history.

(56) References Cited

U.S. PATENT DOCUMENTS

| 6,094,413 | A | 7/2000 | Guerra et al. | |
|---|---|---|---|---|
| 6,445,453 | B1 * | 9/2002 | Hill | 356/450 |
| 6,618,463 | B1 | 9/2003 | Schotland et al. | 378/21 |
| 6,628,747 | B1 | 9/2003 | Schotland et al. | 378/43 |
| 6,667,830 | B1 * | 12/2003 | Iketaki et al. | 359/368 |
| 6,775,349 | B2 | 8/2004 | Schotland et al. | 378/21 |
| 6,882,477 | B1 * | 4/2005 | Schattenburg et al. | 359/577 |
| 2003/0179370 | A1 * | 9/2003 | Goldberg et al. | 356/237.2 |
| 2004/0147808 | A1 * | 7/2004 | MacAulay et al. | 600/160 |
| 2005/0018201 | A1 * | 1/2005 | de Boer et al. | 356/479 |

FOREIGN PATENT DOCUMENTS

| EP | 0688014 | 12/1995 |
|---|---|---|
| JP | 05-34129 | 2/1993 |
| JP | 5034129 | 2/1993 |
| WO | 99/44197 | 9/1999 |
| WO | WO03/062802 | * 7/2003 |

OTHER PUBLICATIONS

Satoshi, English Translation of Abstract for JP 5-34129, Patent Abstracts of Japan, vol. 17, No. 314, Jun. 15, 1993.
Satoshi, English Translation of Japanese Patent JP 5-34129, Jul. 31, 2006.
Weston, et al., Near-Field Scanning Optical Microscopy in Reflection: A Study of far-field collection geometry effects, Review of Scientific Instruments, AIP, vol. 67, No. 8, pp. 2924-2929, Aug. 1, 1996.
Simanovskii et al., "Transient optical elements: application to near-field microscopy", Journal of Microscopy, vol. 210, pp. 307-310, Jun. 3, 2003.

(Continued)

*Primary Examiner* — Joshua L Pritchett
(74) *Attorney, Agent, or Firm* — Greenlee Sullivan P.C.

(57) ABSTRACT

A near-field microscope using one or more diffractive elements placed in the near-field of an object to be imaged. A diffractive covers the entire object, thus signal may thereby be gathered from the entire object, and advantageously increase the signal-to-noise ratio of the resulting image, as well as greatly improve the acquisition speed. Near-field microscopy overcomes the limitation of conventional microscopy in that subwavelength and nanometer-scale features can be imaged and measured without contact.

43 Claims, 9 Drawing Sheets

OTHER PUBLICATIONS

Marks, et al., "Near-Field diffractive elements", Optics Letters, vol. 30, No. 14, pp. 1870-1872, Jul. 15, 2005.

International Search Report received Oct. 2, 2007.

Courjon et al., "Scanning Tunneling Optical Microscopy", Optics Communications, vol. 71, No. 1, 2, pp. 23-28, May 1989.

Girard et al., "Near-Field Optics Theories", Rep. Prog. Phys. 59, pp. 657-699, 1996.

Greffet et al., "Image Formation in Near-Field Optics", Progress in Surface Science, vol. 56, No. 3, pp. 133-237, 1997.

Carney et al., "Inverse scattering for near-field microscopy", Applied Physics Letters, vol. 77, No. 18, pp. 2798-2800, Oct. 2000.

Carney et al., "Determination of three-dimensional structure in photon scanning tunneling microscopy", Journal of Optics: Pure and Applied Optics, No. 4, pp. S140-S144, 2002.

Carney et al., "Theory of total-internal-reflection tomography", Journal of Optical Society of America, vol. 20, No. 3, pp. 542-547, Mar. 2003.

Carney et al., "Near-Field Tomography". Inside Out: Inverse Problems, MSRI Publications, vol. 47, pp. 131-166, 2003.

Frazin et al., "Information content of the near field: two-dimensional samples", Journal of Optical Society of America, vol. 21, No. 6, pp. 1050-1057, Jun. 2004.

\* cited by examiner

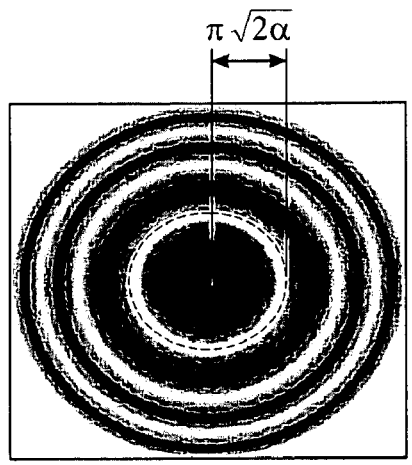
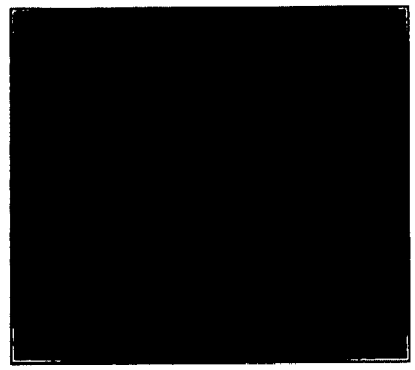
FIG. 9(a)  FIG. 9(b)
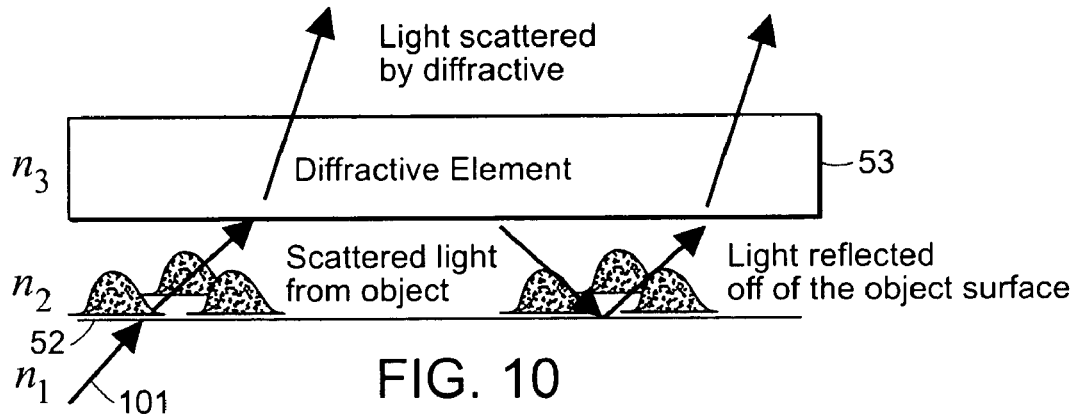
FIG. 10
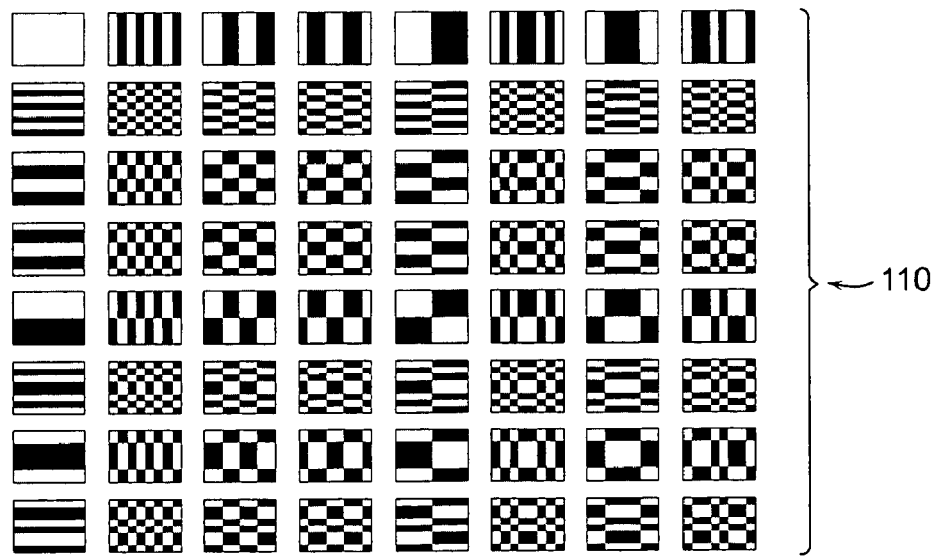
FIG. 11

Diffractive Pattern

Resolution Target

Full Data Reconstruction

Sparse Data Reconstruction

MULTIPLEX NEAR-FIELD MICROSCOPY WITH DIFFRACTIVE ELEMENTS

This application claims priority from U.S. Provisional Patent Application Ser. No. 60/675,838, filed Apr. 28, 2005, which is incorporated herein by reference.

This invention was developed with Government support under Contract Number F49620-03-1-0379 awarded by the United States Air Force Office of Scientific Research. The Government has certain rights in the invention.

TECHNICAL FIELD AND BACKGROUND ART

The present invention pertains to methods and apparatus for imaging at resolutions below that corresponding to the wavelength of illuminating radiation.

The ability to resolve smaller and smaller features using microscopy has resulted in enormous gains in almost all branches of science and technology. Conventional optical light microscopy has been used for centuries, and can resolve features down to the Abbe-Rayleigh diffraction-limit, which is one-half the wavelength of the illumination and thus, for imaging at visible wavelengths, is typically a length scale from 150-350 nm. Comparing this resolution to atomic scales, the diameter of a hydrogen atom is 0.053 nm and the lattice spacing a silicon crystal is 0.51 nm, so there are orders of magnitude of size between conventional microscope resolution and atomic resolution.

While the conventional microscope has been sufficient to image entire biological cells and some of their constituents, continuing improvements in biology and nanotechnology have made attaining sub-optical-wavelength resolution more important. To this end, a number of microscopy methods using radiation other than visible light have been developed. Scanning Electron Microscopy (SEM) and Transmission Electron Microscopy (TEM) use an electron beam to probe surface features, and have a much better resolution limited only by the much smaller wavelength of the electron. Unfortunately these methods require the sample to be placed in a vacuum, which is harmful for many biological samples, and subjects the sample to ionizing and heating radiation often damaging the sample.

Another method, Scanning Tunneling Microscopy, (STM) operates by scanning an atomically sharp conducting probe over the surface, and measures the electric current produced by quantum mechanical tunneling at each point on the surface. Atomic Force Microscopy (AFM) scans a tip attached to a cantilever over the surface and measures the atomic forces exerted on the tip by measuring the deflection of the cantilever. While both STM and AFM have produced excellent atomic-scale images, they are slow because they require serial scanning of the surface, moreover, near-contact of the probe and surface can result in surface alteration or tip damage. In addition, the resolution achievable by these methods is dependent on the exact shape of the tip, which must be made highly uniformly to produce a repeatable image.

These disadvantages have motivated the creation of methods using visible light that can resolve features below the Abbe-Rayleigh limit. The Abbe-Rayleigh limit exists because when light is scattered off of surfaces it is encoded into both homogeneous and evanescent waves. Homogeneous waves (such as plane waves) can propagate through empty space freely, and therefore can be sensed at a location remote from the scatterer. Unfortunately, these waves contain only information corresponding to features greater than one-half the wavelength of light on the surface. The evanescent waves, which correspond to the features less than one-half the wavelength, do not propagate away from the scatterer more than a few wavelengths at most. The magnitude of the evanescent waves decays exponentially very quickly away from the scatterer, so that even a few wavelengths from the scatterer the evanescent waves are not directly detectable. Because of this, a conventional lens, which is typically many wavelengths away from the scatterer, does not receive or relay the evanescent waves. This is what limits conventional microscopy to the Abbe-Rayleigh limit. However, if a probe is placed less than a wavelength from a scatterer, the probe can scatter a portion of the evanescent waves in the vicinity of the scatterer into homogeneous waves, which then can be detected in the far field. This principle is the basis for near-field microscopy instruments.

The term "near-field," as used herein and in any appended claims, shall have the meaning of a regime in which evanescent components of a scattering wavefunction are significant.

The most widely used methods of near-field microscopy are now discussed with reference to FIGS. 1(a) and 1(b). The Near-Field Scanning Optical Microscope (NSOM), depicted schematically in FIG. 1A and designated generally by numeral 10, places a probe 12 in the near field of a sample 8, typically between 10-200 nm from the sample 14. This probe is scanned serially over the surface, which is illuminated by uniform laser light. A typical configuration is to place the sample (equivalently referred to, herein, as the "object") on a transparent triangular prism. The laser is incident on a surface under the sample so that it reflects off of the interior surface of the prism by total internal reflection. In the absence of the sample, the beam only extends a small fraction of a wavelength outside of the prism because the wave is evanescent. The sample perturbs the surface of the prism and scatters light from the evanescent field, some of which is collected by the probe. The light captured by the probe is guided by an optical fiber to a photodetector, where the collected photons are counted.

At each point on the surface, the photons scattered by the probe from the optical waves near the surface are collected and counted to produce an image. Typically the probe consists of a silica optical fiber, which has been heated and drawn to form a pencil-like tip on the end. The end of the fiber is then coated with a thin layer of metallic conductor. The tip of the pencil at the end of the fiber is then removed to form a tiny aperture surrounded by metal, often 10-20 nm in diameter, but open at the end. When this tip is placed in the near field of a scatterer, some of the field near the aperture at the end of the fiber is coupled into the optical fiber, where it travels up the fiber to be collected and counted at the distal end. The size of the aperture and the proximity to the sample determine the achievable resolution of the NSOM instrument.

The probe (or sometimes the sample) is translated in three dimensions with nanometer precision, typically with piezoelectric transducers. Often this is achieved in practice by integrating the NSOM instrument with an Atomic Force Microscope (AFM). The AFM measures the force between the surface 8 and a sharp probe at the end of a cantilever. By maintaining a constant force between the surface and the probe, the shape of the surface can be mapped out by determining the positions of the probe while a particular force magnitude is maintained between the surface and probe. To integrate the NSOM into the AFM, the tip of the probe is made of a material that will scatter light from the near-field of the sample. This light is collected by a lens and imaged onto a photodetector.

Apertureless NSOM, depicted schematically in FIG. 1(b), uses a sharp tip metal probe 18 supported by cantilever 17 to scatter light from the near-field to the far field, where it is collected by a lens 19. This method likewise employs serial scanning techniques, and has a resolution limited by the tip size. The probe (or sometimes the sample) is translated in three dimensions with nanometer precision, typically with piezoelectric transducers. Often this is achieved in practice by integrating the NSOM instrument with an Atomic Force Microscope (AFM). The AFM measures the force between the surface and a sharp probe at the end of a cantilever. By maintaining a constant force between the surface and the probe, the shape of the surface can be mapped out by determining the positions of the probe while a particular force magnitude is maintained between the surface and probe. To integrate the NSOM into the AFM, the tip of the probe is made of a material that will scatter light from the near-field of the sample. This light is collected by a lens 19 and imaged onto a photodetector.

While the foregoing near-field methods have been able to achieve high-resolution images (of approximately 20 nm resolution or better), they suffer from other disadvantages. First, the tip must be serially scanned over the surface. This means that the acquisition occurs only one point at a time and is very slow. Furthermore, while the entire surface is being illuminated with light, only the region near the tip provides signal at any given instant. This means that much of the available optical signal is not collected but could provide improved signal quality. Finally, in order to improve the resolution of the instrument, the aperture at the end of the probe must be made smaller. Unfortunately, this means that the probe also collects less light, further decreasing available signal. All three of these deficiencies are addressed in accordance with embodiments of the invention by gathering data from the entire scattering surface simultaneously while not requiring small apertures to achieve high resolution.

SUMMARY OF THE INVENTION

In accordance with preferred embodiments of the present invention, near-field imaging is provided by
 a. illuminating the object with a substantially coherent beam of substantially monoenergetic particles, the coherent beam characterized by an optical path;
 b. interposing a diffracting medium in the near field of the object for diffracting particles illuminating the object, the diffracting medium characterized by structure of scale length varying with position;
 c. transferring the particles to form a convolution image substantially at a focal plane;
 d. deconvolving the convolution image with respect to the structure of the diffracting medium for obtaining an image of the object.

The monoenergetic particles may be a coherent beam of photons, for example, and, in the description that follows, may be referred to thereas, without loss of generality, though the application of the invention to other particles is within the scope of the invention. In various other embodiments of the invention, the particles, having been diffracted by the diffracting medium and having interacted with the object, may be interfered with a reference beam of particles, such that the convolution image is an interferogram image containing phase information. The step of illuminating the object may include illuminating the object with electromagnetic radiation, selected from the group of visible and infrared radiation, such that the particles are photons, in which case detecting the convolution image is by means of an optical detector.

The step of interfering may be performed by incorporating the illuminating coherent beam into one arm of a Mach Zehnder interferometer.

In accordance with another aspect of the invention, a near field microscope is provided that has a source of substantially coherent illumination for illuminating an object and a diffractive element characterized by a pattern of spatial frequency varying with position, where the diffractive element is disposed within a near field of the object. The near field microscope also has a field relay telescope for relaying a field scattered by the diffractive element to a focal plane, a focal plane sensor for measuring the field scattered by the diffractive element, and a processor for deconvolving the field measured by the focal plane sensor to recover an image of the object.

In accordance with further embodiments of the invention, the source of substantially coherent illumination may include a laser. The diffractive element may be a transmission diffractive. The diffractive element may be characterized by radial symmetry, and may be a Fresnel zone plate. The diffractive element may include a patterned surface, and may be disposed between the source of illumination and the object.

In yet further embodiments of the invention, the field relay telescope may include a first lens of high numerical aperture and a second lens of long focal length.

BRIEF DESCRIPTION OF THE DRAWINGS

The foregoing features of the invention will be more readily understood by reference to the following detailed description, taken with reference to the accompanying drawings, in which:

FIG. 9 shows a spatial-frequency representation of a near-field diffractive microscope, in accordance with an embodiment of the invention using a Fresnel-zone plate diffractive.

FIG. 9(a) is the spatial frequency representation of the Fresnel zone-plate alone, with a dotted circle placed at the first null surrounding the origin in the spatial frequency space. For a plate with chirp rate $\alpha$, the first null occurs at $\pi\sqrt{2\alpha}$ distance from the origin. FIG. 9(b) is the spatial frequency representation with the Fresnel zone plate when it is observed in the far-field with a band limit at $\pi\sqrt{2}\alpha$, which is the pattern of part (a) convolved with a circ function at radius $\pi\sqrt{2}\alpha$.

FIG. 10 shows multiple reflections of illumination from the object surface.

FIG. 11 shows a diffractive containing two-dimensional Hadamard-Walsh codes of size 8 by 8. The white features are where the illumination is blocked at the diffractive surface, and the black areas are where it is allowed to pass through the diffractive surface.

DETAILED DESCRIPTION OF SPECIFIC EMBODIMENTS

Fundamental Principles and Terminology

As background to a description of the principles underlying the present invention, of this new instrument, a standard imaging instrument is first considered. If we image with a standard microscope of a numerical aperture given by N, the minimum feature size that may be imaged is approximately $\lambda_0/2N$, where $\lambda_0$ is the illumination wavelength. (The numerical aperture refers to the sine of the opening half-angle (or the angular semiaperture) in the object space multiplied by the refractive index of the object space and is a measure of the light-gathering power of an optical system.)

The performance of imaging systems is also commonly understood in terms of spatial frequencies. A single spatial frequency can be visualized by a periodic sinusoidal pattern of parallel lines. The number of lines per unit length (perpendicular to the lines) is the spatial frequency. For example, a pattern of lines where each line is separated by 10 μm has a spatial frequency of 100 lines per mm, or 100 mm$^{-1}$. Typically, this quantity is multiplied by $2\pi$ to be expressed in radians per unit length, for example $200\pi$ radians/mm=100 lines/mm. In terms of spatial frequency, the maximum spatial frequency that a microscope objective of numerical aperture N can resolve is given by $4\pi N/\lambda_0$. Spatial frequency is typically expressed as a vector quantity, with the vector pointing in the direction perpendicular to the lines of the frequency. The imaging of a particular object can be modeled by decomposing the scattering function of the object into its constituent spatial frequencies using Fourier analysis, and then propagating each of the individual spatial frequencies through the optical system.

A typical optical system possesses a "bandpass," which represents the set of spatial frequencies that can propagate through the optical system. FIG. 2(a) shows the bandpass of an imaging system with the maximum allowable numerical aperture in free space, N=1. The bandpass is plotted on a graph where the two axes are the spatial frequencies in the directions along the surface of the object. In the case of a standard imaging system with a circular pupil, the bandpass consists of all of the spatial frequencies less than a certain maximum frequency. In the case of a microscope with N=1, all spatial frequencies with a magnitude less than $2\pi/\lambda_0$ can be imaged through the system. This is the best possible resolution achievable with standard far-field optics.

In general, the object scatters incoming laser light to many spatial frequencies, one of which is given by k. If the spatial frequency $|k|<2\pi/\lambda_0$, it is a propagating, and not an evanescent, wave and therefore can be collected by far-field optics. On the other hand, an evanescent wave does not extend away from the object and therefore cannot be detected.

Figure 1B:
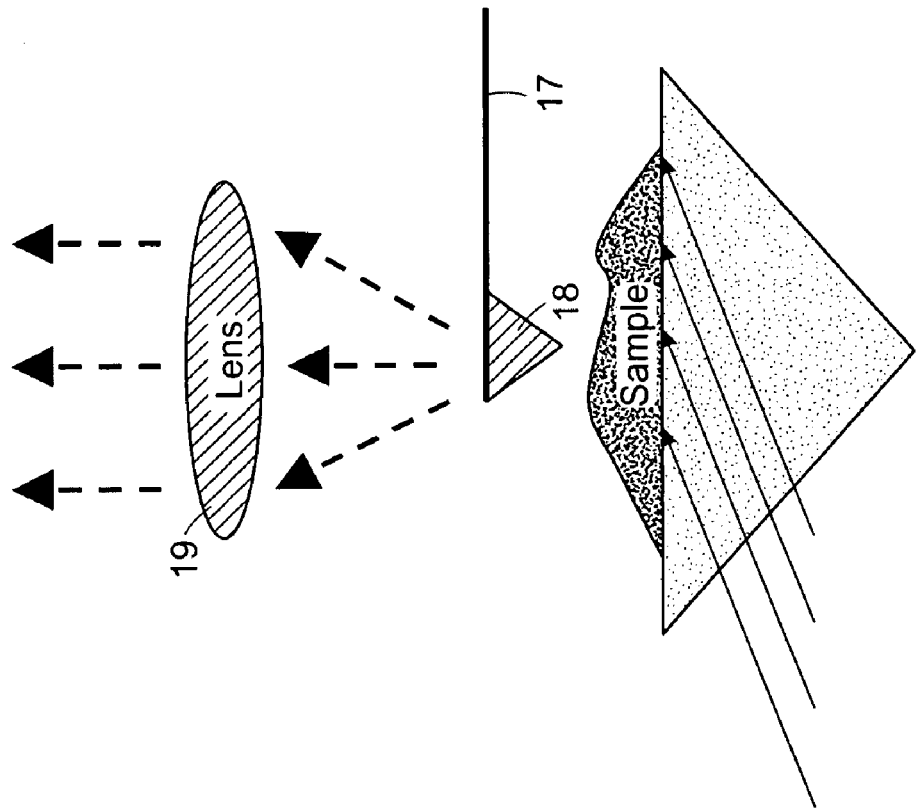
FIG. 1(a) is a schematic depiction of a prior art NSOM instrument, while FIG. 1(b) show a prior art NSOM-enhanced AFM instrument.
Figure 1A:
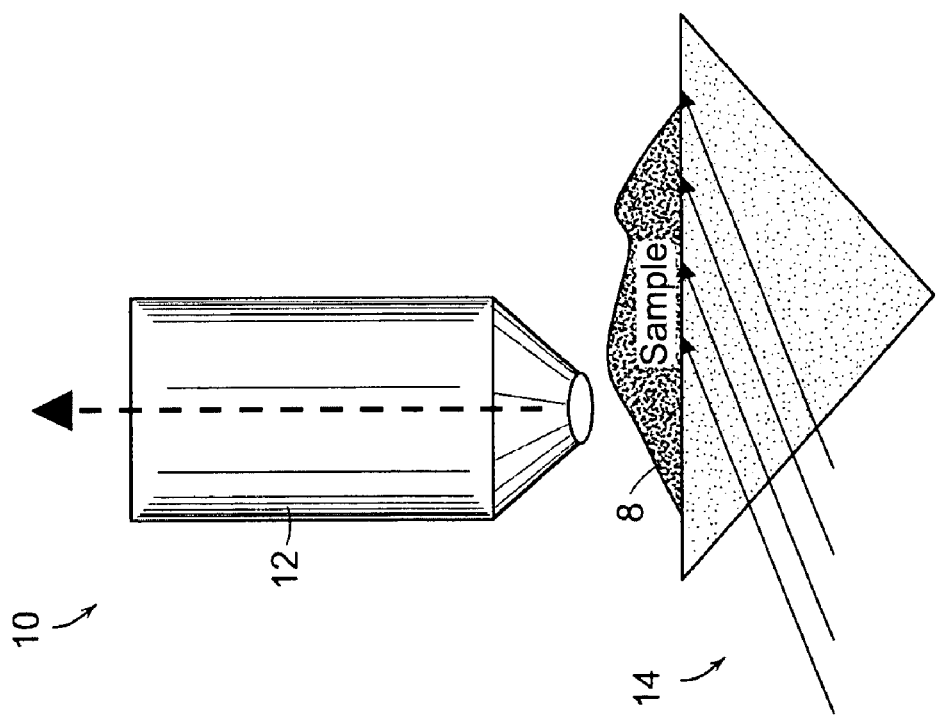
Figure 2B:
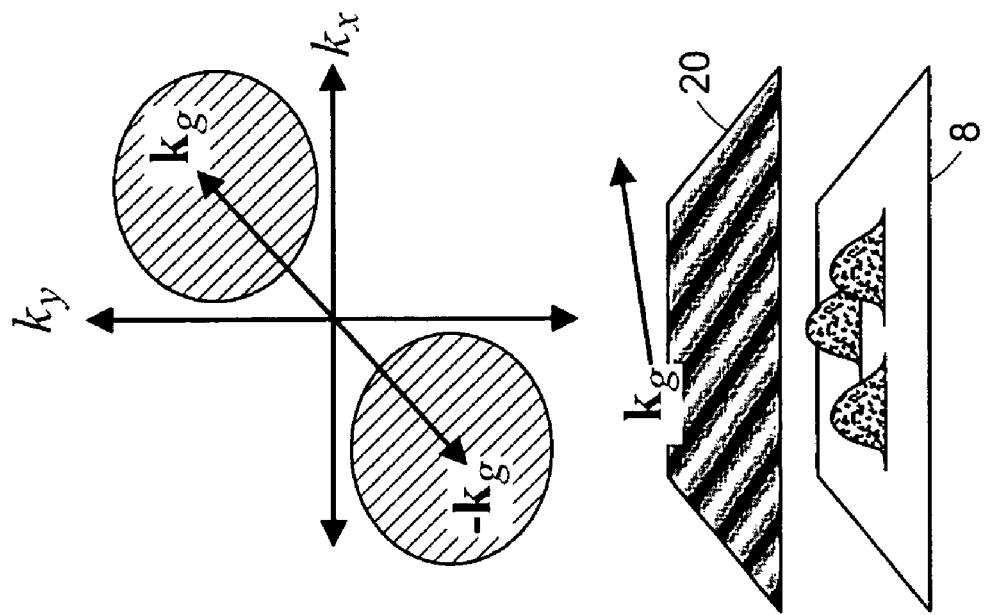
FIG. 2 is an image of the bandpass of a standard (a) imaging instrument, and of an imaging instrument with a transmission diffraction grating placed closed to the object (b).
Figure 2A:
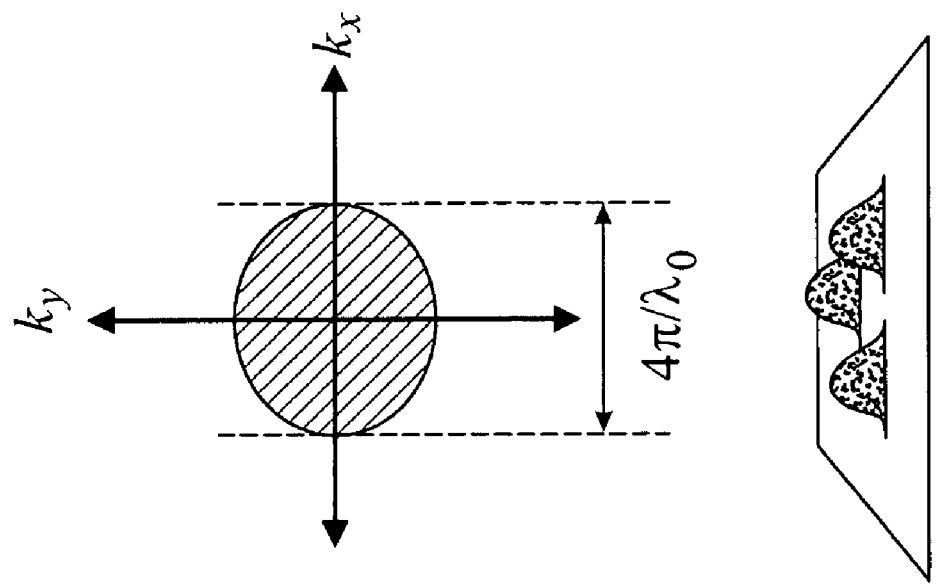

We now consider placing a thin diffraction grating 20 in close proximity (a small fraction of a wavelength) from the object 8, as is shown in FIG. 2(b). This grating has a line spacing $\Lambda$ such that the spatial frequency of the grating $|k_g|=2\pi/\Lambda$. A spatial frequency k incident on the grating is scattered into two new spatial frequencies $k+k_g$ and $k-k_g$. If the magnitude of either of these new spatial frequencies is less than $2\pi/\lambda_0$, that is $|k+k_g|<2\pi/\lambda_0$, or $|k-k_g|<2\pi/\lambda_0$, then the formerly evanescent spatial frequency can now be coupled to a propagating wave and be collected by the far-field optics. Therefore the grating can make spatial frequencies that were formerly inaccessible in the far field accessible. The new bandpass of the optical system is plotted in FIG. 2(b), which now shows two bandpass circles of radius $2\pi/\lambda_0$ that are separated from the origin by the grating's spatial frequency $k_g$.

Figure 3:
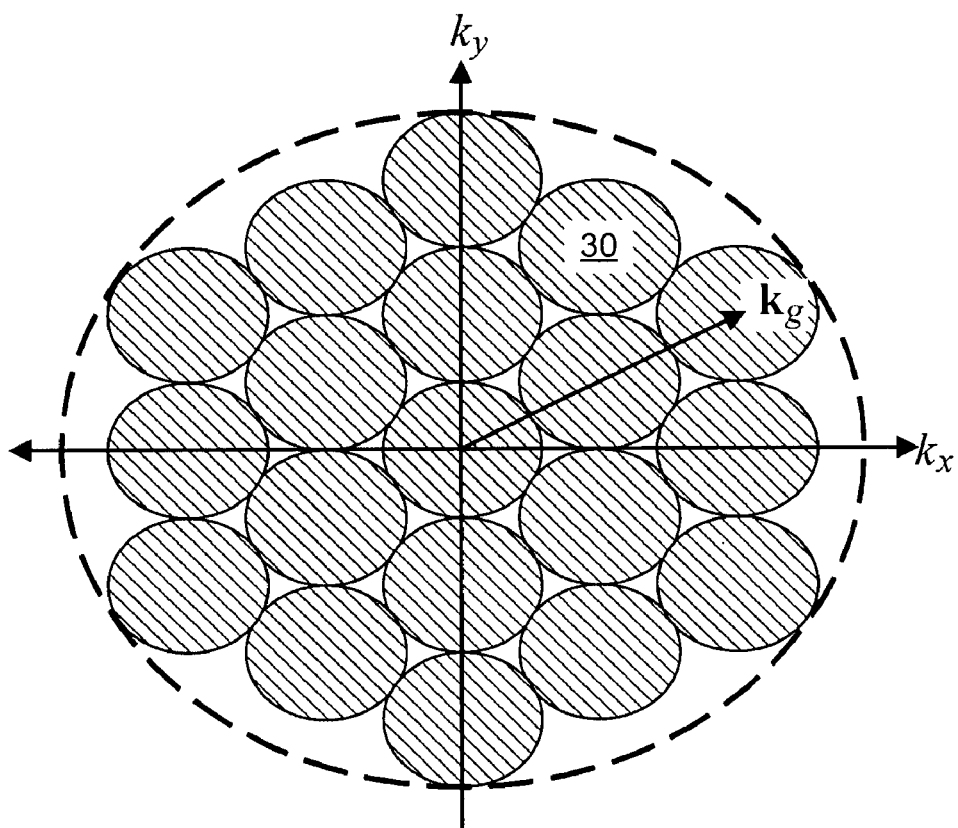
FIG. 3 is a depiction, in the frequency domain, wherein each pair of circles symmetric about the origin corresponds to a region of spatial frequencies accessible by a particular grating, such that, by choosing gratings to access regions of spatial frequencies, one can "tile" the spatial frequency space to exhaustively sample, in accordance with embodiments of the present invention, the spatial frequencies of an object.

By placing several different gratings with various spatial frequencies over the object, different regions of spatial frequencies become accessible in the far field. One can imagine exhaustively "tiling" an entire region of the spatial frequencies of the object by imaging the objects with multiple gratings. FIG. 3 shows an example of the regions 30 of the spatial frequencies that are sampled with several choices of gratings. This method would require placing several different gratings over the object and registering them relative to the object. While this method is a workable way to do near-field imaging of surfaces, a more practical way of doing so is disclosed in accordance with the present invention.

Figure 4:
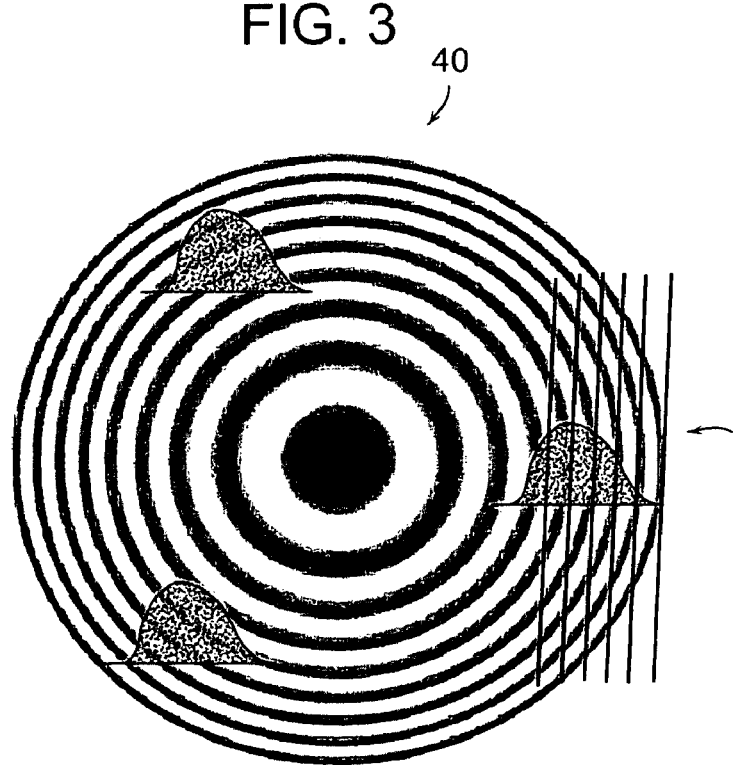
FIG. 4 shows a Fresnel zone plate, with the spatial frequency of the plate increasing monotonically from the center of the plate, used as a diffractive in accordance with one embodiment of the present invention. Locally, the Fresnel zone plate looks like a grating with a single spatial frequency.

Rather than using several different gratings, a single pattern containing all of the spatial frequencies is employed in accordance with preferred embodiments of the invention. One such pattern is a Fresnel zone plate, and is shown in FIG. 4 where it is designated generally by numeral 40. The Fresnel zone plate is a radially symmetric diffraction grating, where the spatial frequency of the diffraction grating increases with distance from the center of the grating. As shown in the figure, the Fresnel zone plate in any small region approximates a linear grating 42. If the Fresnel zone plate is large enough, then there will be large regions of the plate with essentially constant spatial frequency. Various locations of the Fresnel zone plate can then be chosen to cover the sample to provide diffraction gratings with various spatial frequencies. A single large Fresnel zone plate can substitute for all of the different gratings one would use to image the sample.

It is not necessary, however, to use a Fresnel zone plate this large. If we regard the object itself as an ensemble of small objects that are reconstructed separately, we can consider the spatial frequency of each region on the Fresnel zone plate to be constant over each small region of the object. The minimum size of the individual sub-objects that the larger object can be divided into is determined by the minimally resolvable spot size of the far-field imaging system.

Description of Functional Features of the Instrument

One object of the invention is to facilitate resolution of sub-wavelength optical scatterers. Salient functional features of the invention are now described with reference to FIG. 5.

1. Illumination field: This is a source of coherent light 50, typically a laser (e.g. a Helium-Neon or a diode laser) that is used to illuminate the object. The object may be illuminated in several ways: through the diffractive element, directly from below, or from below using an evanescent wave (created for example by total internal reflection). Some of the illumination light is scattered by the object.

2. Object plane: This is the surface 52 on which the object to be imaged rests. If the object is illuminated from below, the surface must be transparent to the illumination to allow it to reach the object. In addition, the object plane may be on a two- or three-dimensional translation stage to provide relative positioning between the object and measurement planes, and may have tilt control to keep the object plane parallel to the measurement plane.

3. Measurement plane: This plane 53 contains the diffractive element that scatters the light already scattered by the object into the far field to be collected. The measurement plane may be on a two- or three-dimensional translation stage to move it relative to the object plane, and have tilt control to keep it parallel to the object plane.

4. Field relay telescope: This system 54 relays a magnified version of the field scattered from the diffractive element in the measurement plane to the focal plane sensor. The field as it appears in, or near, the focal plane will be referred to herein, and in any appended claims, as a "convolution image." One lens 55 of this telescope is typically a high numerical aperture microscope objective, while the other lens 56 can be a relatively long focal length achromatic lens. The field relay telescope is designed to image afocally and telecentrically between the diffractive element and the focal plane sensor. A pupil stop 555 may be placed inside the telescope to provide a limited bandpass to the relayed field if needed.

5. Focal plane sensor. This measures the spatially varying intensity of the optical field, and is typically a CCD (charge coupled device), a CMOS photodetector array 58, or a photographic emulsion. To facilitate the holographic measurement of the optical field, a separate reference beam from the same illumination laser may be combined with the field relayed from the telescope with a beamsplitter, in that case forming an interferographic convolution image or interferogram.

6. Processor. (not pictured) A processor, such as a computer, automates the recording of the information from the focal plane sensor, and processes the information to produce an image of the object surface. The computer may also send instructions to the nanopositioning system to move the object or measurement plane, and supervise the feedback system maintaining the correct positioning of the object or measurement plane. The computer may provide instructions to the laser source to change the amount of optical power it produces. It will also have an input and output device to allow an operator to provide the computer instructions and to relay the results of data acquisition back to the operator.

Exemplary embodiments of the salient components of the invention are now discussed.

A. Illumination Field

The illumination field serves to provide a known and uniform optical field incident on the object. This field is typically generated by a laser source, for example a laser diode or a Helium-Neon laser. Typical useful wavelengths for the source are from 400-2000 nm, the transparency range of most optical glasses, and low power of approximately 1 mW is needed. The laser beam is collimated and made spatially uniform by employing a spatial filter and a collimation lens, so that the beam approximates a uniform plane wave over the entire object. The object can be illuminated in several ways. The object can be illuminated through the diffractive element, by placing a beam splitter before or inside the relay telescope to allow the illumination to enter the microscope objective. The object can be illuminated from below if the surface on which the object rests is transparent to the illumination. Or the object can be illuminated using an evanescent wave. This may be accomplished by placing the object on a prism, and illuminating the prism such that the beam is incident on the inner surface on which the object rests at greater than the angle of total internal reflection.

B. Object Plane

The object plane is an optically flat, polished surface on which the object rests. If the object is to be illuminated from below, the surface should be transparent to the illumination. Several measurements may be made with relative translations between the measurement and object planes. To facilitate this, the object may need to be on a two- or three-axis translation stage, and perhaps also require two-axis tilt control to keep the object plane parallel to the measurement plane. The translation and tilt controls likely need to be capable of nanometer-scale precision control. These can be implemented by piezoelectric transducers, MEMS actuators (e.g. electrostatic comb actuators), or inductive voice coils. It is likely that closed loop feedback is required to maintain a precise spacing between the measurement and object planes. Mechanisms for determining proximity and relative position of the two planes include inductive or capacitive position sensors, MEMS actuators, quantum mechanical tunneling from scanning tunneling microscopy probes, atomic force probes, and laser or white-light based interferometric ranging measurements. A method of vibrational isolation of the instrument from its environment may be required to eliminate spurious motions, which can be achieved by spring-shock dampeners or placement on an optical bench. The object plane may be a part of the object being sampled itself, for example if it is a silicon or sapphire wafer with nanopatterning on it. Alternatively, the object plane may be a triangular prism of high-refractive-index transparent index material to facilitate illumination of the object by total internal reflection. Good substrate materials for the object plane (depending on the illumination wavelength) are optical quality glasses, silica glass, fused silica, chalcogenide glass, quartz, sapphire, calcium fluoride, magnesium fluoride, silicon, germanium, gallium nitride, gallium arsenide, zinc selenide, or zinc sulfide.

The object plane may have a micromachined well etched into the top of it, in which the object being imaged can be placed. The well can enable the measurement and object planes to be in contact, but retain a small sub-wavelength gap between the measurement plane and the object being measured. Alternatively, micromachined bearings and grooves can be placed between the object and measurement planes to maintain a gap between them but facilitate their relative translation. The object plane may have alignment marks or grooves or other reference features to facilitate the registration of the measurement and object planes. Light interference effects between the measurement and object plane surfaces may be used to gauge the gap between the surfaces.

C. Measurement Plane

The measurement plane is a nanopatterned surface that is placed at a sub-wavelength distance from the object to scatter light from the near field of the object to the far field where it is collected. The measurement plane may need to be on a three-dimensional translation mechanism and/or tilt stage to facilitate relative motion of the measurement and object planes, the design of which can use the same methods as that of the object plane.

The measurement plane is typically a planar optical diffractive element made of a substrate transparent to the illumination and with parallel optically polished flat surfaces. Good substrate materials include (depending on the illumination wavelength) chemically-deposited diamond, optical quality glasses, silica glass, fused silica, chalcogenide glass, quartz, sapphire, calcium fluoride, magnesium fluoride, silicon, germanium, gallium nitride, gallium arsenide, zinc selenide, or zinc sulfide. The surface placed next to the object is nanopatterned, while the other surface may be left unpatterned, except perhaps for an antireflection coating. The field relay telescope is preferably designed to compensate for any spherical aberration or other optical aberrations introduced by the diffractive element. The pattern in the surface may be either etched into the surface, material chemically or electrically implanted into the surface, or may be made with a material deposited onto the surface, e.g. a metallic coating. The surface of the diffractive can be nanopatterned using visible, ultraviolet, or x-ray photolithography, electron beam lithography, nanoimprinting, or be patterned with a scanning probe instrument such as a scanning tunneling microscope or an atomic force microscope. The patterning can occur in resist and methods such as reactive ion etching or plasma etching can be used to etch the pattern into the substrate itself. The pattern can also be etched into a layer deposited by chemical vapor deposition or other thin-film layer growth techniques. A layer of scatterers can be embedded into the substrate by using a resist layer as a mask for chemical, electrolytic, or ion-implantation alteration of the surface.

Alternatively, the pattern can be deposited on the surface. A good deposition coating is both thin (a fraction of a wavelength, typically 20-200 nm in thickness), durable, and will scatter the illumination wavelength to a sufficient degree to obtain a measurable signal. Highly scattering metals that can be used for coatings include gold, platinum, iridium, rhodium, silver, and aluminum. A thin protective coating (for example magnesium fluoride), usually 10-100 nm in thickness, may be deposited over the metal to protect it from oxidation and abrasion, though it should not have to come in contact with the object. Metals such as tungsten or metallic oxides such as titanium dioxide, aluminum oxide, zinc oxide, or zirconium oxides can be used as a coating if more durable materials are required. Other deposition materials readily available useful as scatterers are silicon, gallium arsenide, gallium nitride, silicon carbide, and diamond. Materials can be deposited using sputtering, electrolysis, or chemical vapor deposition, and patterned by the nanopatterning techniques already mentioned using a resist layer and reactive ion etching or plasma etching.

The pattern fabricated onto the diffractive element (otherwise referred to herein as the "diffractive") is a two-dimensional pattern containing the range of spatial frequencies that one wishes to image. Typical examples of patterns etched onto the diffractive depending on the application include single-frequency diffraction gratings, gratings with a linearly increasing frequency (chirped gratings), Fresnel zone plates, binary two-dimensional orthogonal Hadamard-Walsh codes, and combinations of these placed onto a periodic lattice. The pattern may be encoded into either the phase of the diffractive by changing the relief or thickness of the surface, or into the amplitude by changing the surface absorption profile. Because the diffractive layer is typically very thin, both phase and amplitude perturbations produce a similar scattering effect. If the pattern etched onto the diffractive is not known to sufficient accuracy, it may be necessary to calibrate it by using the diffractive to image a known test pattern, e.g. a point object or another nanonpatterned or self-assembled structure.

The diffractive is placed close enough to the object to image the desired smallest resolvable feature. This spacing is approximately equal to the smallest feature size. Because of the need to maintain extended surfaces of several microns to millimeters in size parallel to each other tens of nanometers apart, nanoactuators in closed loop feedback will need to sense and adjust the spacing between the two surfaces. Three actuators and sensors will maintain a tripod of points to ensure the planes remain parallel. Alternatively, features or indentations may be etched or patterned onto the diffractive surface so that the diffractive surface and object surface can come into contact but maintain the correct gap between the object being imaged and the diffractive pattern. Because of the very small gap required between the two surfaces, a clean environment (such as a clean room) is needed to ensure that no contamination particles separate the measurement and object planes.

D. Field Relay Telescope

The purpose of the field relay telescope is to relay a bandlimited version of the field from the measurement plane to the focal plane sensor. The field relay telescope is a telecentric imaging system, consisting of two main lens components. A high numerical aperture microscope objective is used to collect the field scattered off of the diffractive. The diffractive element is placed at the focal plane of the objective. Typically this objective will be a plan-field, infinity-corrected objective, perhaps achromatically corrected if multiple illumination wavelengths will be used. The off-axis aberrations need to be corrected over the entire field of the diffractive. The objective may also need to be designed to correct for any spherical aberration or other aberrations introduced by the diffractive element. The lens design issues and methods for creating such an objective are well known. The second lens is a relay lens used for completing the telescope. Its focal length is usually much longer than that of the microscope objective so that a large magnification of the field is achieved onto the focal plane. This lens is typically much simpler, for example it may be a common achromatic doublet lens. The two lenses are typically spaced so that the resulting imaging system produces a telecentric image between the measurement plane and the focal plane array. An aperture can be placed in the pupil plane between the microscope and relay lenses to enforce a bandlimit for the field, either to minimize aberrations or to allow the optical system to be better characterized.

Several manufacturers, including Nikon, Olympus, Leica, and Edmund Optics provide microscope objectives usable for this instrument. Many microscope objectives will already be designed to correct the spherical aberration introduced by a microscope cover slip. The diffractive can then be fabricated onto a microscope coverslip or another substrate with the same spherical aberration to ensure that the optical system will be well corrected. The entire lens relay telescope can be placed into a lens tube or other rigid assembly.

Figure 6:
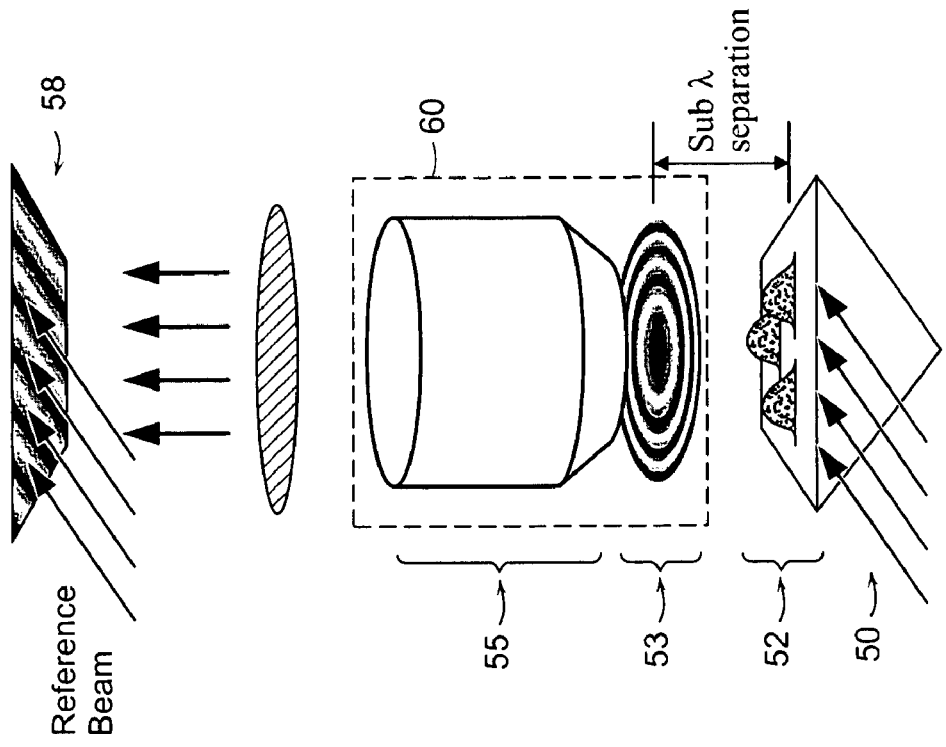
FIG. 6 is a diagram of the instrument of embodiments of the present invention, with a near-field microscope objective.

It is desirable to combine the diffractive element 53 and the microscope objective 55 into a single rigid element, the near-field microscope objective 60. Many plan-field microscope objectives with a short working distance have a bottom surface next to the object that is flat. Rather than fabricating the diffractive separately, the diffractive can be fabricated onto the flat bottom surface of the microscope objective. The microscope objective can then be designed to image the bottom surface of the objective rather than a surface outside of the objective. FIG. 6 shows the diagram of the instrument with the combined elements in a dotted-line box 60. This design has a number of advantages.

It is preferred that the diffractive and microscope objective are rigidly bound to preclude the diffractive element going out of focus. Because the diffractive is fabricated onto a medium with a refractive index greater than that of air, more spatial bandwidth can be conducted from the field scattered from the diffractive to the far field. Curved surfaces inside the lens can prevent the total internal reflection of the high spatial frequencies that would make them otherwise inaccessible. By fabricating them together, the lens can be designed to minimize the aberrations specific to imaging the embedded diffractive, minimizing cost and weight. In addition, the proximity sensors or probes used to maintain the correct distance between the measurement and object planes can be incorporated into the body of the microscope objective, ensuring there is rigid and accurate registration between the sensors and the diffractive. Combining the diffractive and microscope objective into a single assembly makes it much easier to replace them both as a unit, so that the imaging system can be flexibly adapted to different imaging needs without requiring precision realignment.

E. Focal Plane Array

The focal plane array electronically detects the intensity of the incoming optical wave relayed by the field relay telescope from the measurement plane. The array may be (depending on illumination wavelength and desired speed of acquisition) a Charged Coupled Device (CCD) made of silicon or InGaAs, a silicon CMOS image sensor, or an array of photodiodes. The focal plane array will detect the number of photoelectrons collected at each photosensor site and encode it into a digital or analog signal. This signal is relayed to the computer to be digitized, recorded and processed into an image. The magnification of the telescope will need to be large enough (or the photosensor site size small enough) to ensure sufficient sampling of the optical field.

It is to be understood that the optical wave may be detected elsewhere than in the focal plane within the scope of the present invention. In particular, the field may be detected in the pupil plane, in which case a Fourier transform of the far-field is measured rather than the far-field itself.

Figure 5:
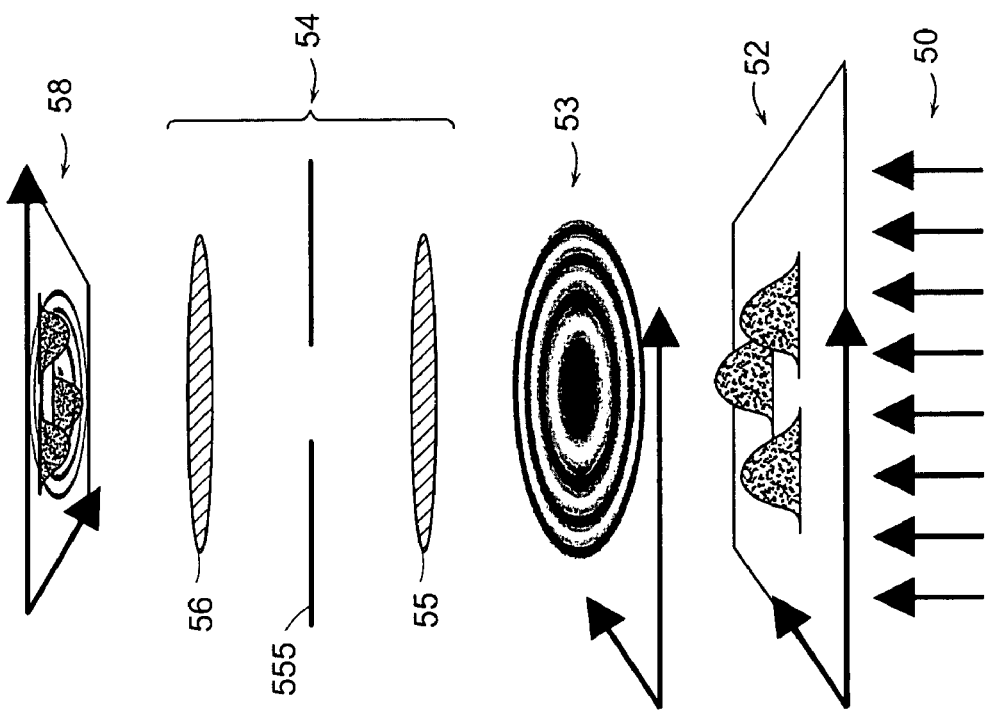
FIG. 5 shows the primary functional components of a near field microscope in accordance with embodiments of the invention.
Figure 7:
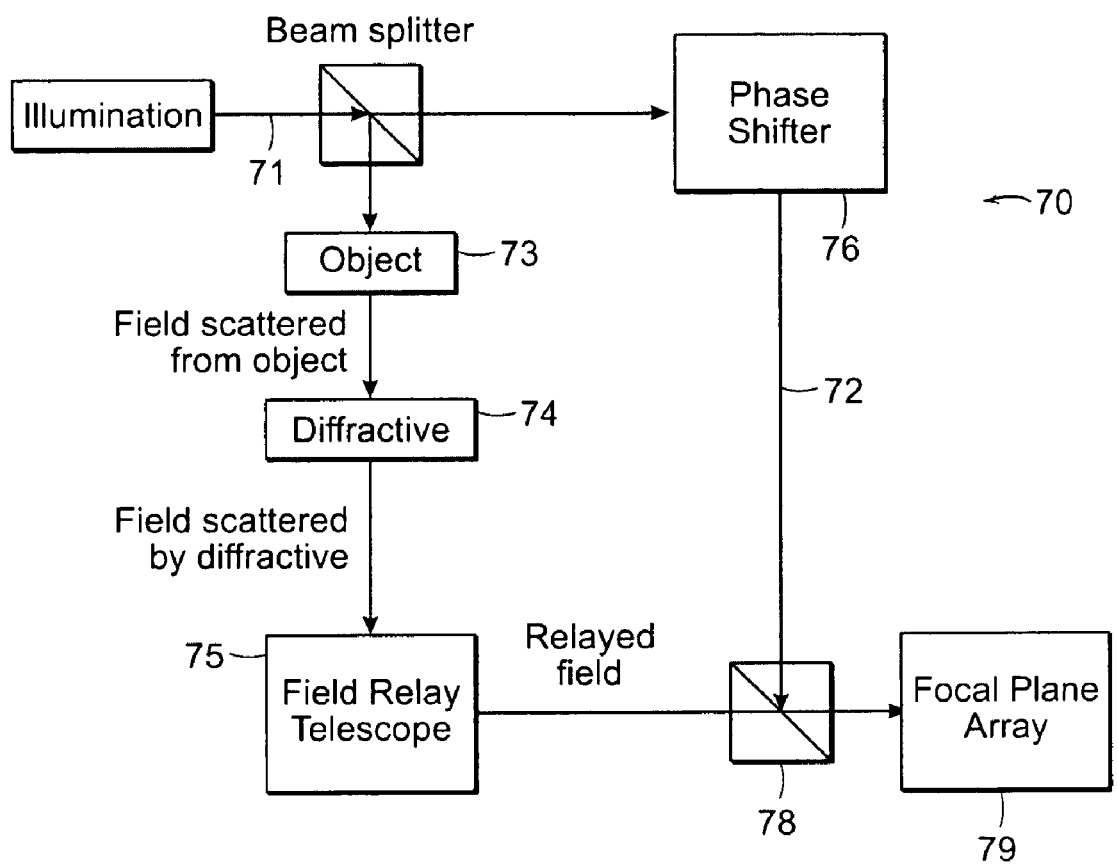
FIG. 7 is a block diagram of a near-field imaging system embedded in a Mach-Zehnder Interferometer, in accordance with embodiments of the present invention.

To allow measurement of the amplitude and phase of the optical field incident on the focal plane array 58, the system of FIG. 5 is embedded into a Mach-Zehnder interferometer 70 as shown in FIG. 7. The illumination beam 71 is split into two beams, a reference beam 72, and a beam used to illuminate the object 73. The object illumination scatters off of the object, traverses the diffractive 74, and is magnified by the field relay telescope 75. The reference beam has a known phase added by a phase shifter 76 to facilitate interferometric detection of the field on the focal plane array. The phase shifter adds a small amount of extra delay to the optical field corresponding to a fraction of a wavelength. The shifter can be implemented by a mechanically scanned mirror, a mirror on a piezoelectric transducer, a liquid crystal retarder, an electro-optic modulator, or an acousto-optic modulator, all, by way of example. The fields from the relay telescope and the phase shifter are recombined using another beam splitter 78, and the focal plane array 79 detects the intensity of the interference between the two optical fields. By shifting the phase of the reference beam to three known phases (e.g. 0, $2\pi/3$, and $4\pi/3$ radians) the optical field relayed from the telescope can be inferred. To maintain a known optical phase difference between the reference and relayed fields, the path lengths of the two beams may need to be controlled to within a fraction of a wavelength. This can be achieved by vibration isolation apparatus such as spring and shock dampeners, or placement of the interferometer on an optical bench.

Instead of using a phase shifter, the two beams may be interfered onto the focal plane with an angle between them, forming a Leith-Upatnieks off-axis hologram. The relative phase and amplitude between the beams can then be inferred by using Fourier-Hilbert analysis of the interferogram sampled by the focal plane. A point scatterer, or a scatterer with a uniform phase can be placed in the object to facilitate measurement of the relative phase of the two beams, which can be used to remove phase noise introduced by vibrations.

Manufacturers of CCD focal plane arrays suitable for this application include Pulnix, Sony, Dalsa, Basler, Roper Scientific, Apogee, Andor, and Kodak.

F. Processor

A processor, such as a computer, receives and records the intensity data from the focal plane array, and then calculates the resulting estimate of the image based on the data. The computer has interface hardware to control, transmit, and receive data from the focal plane array. The computer includes a storage device to record the data, and a numeric processor with which to calculate the image. The computer may include a user interface with which to receive instruction from an operator, and to provide the resulting image information.

In addition, the processor may coordinate the data acquisition process. The field from the relay telescope will be sampled for many relative positions between the object and measurement planes. The computer can send instructions to the translation hardware to move the relative positions between the object and measurement planes. The computer can monitor and adjust any electronic feedback that maintains the relative positions of the object and measurement planes. The computer may also send instructions to the phase shifter to control the relative phase of the reference and relay signal beams. The computer may send the illumination system instructions to control the power or the wavelength of the illumination.

The processing by the computer includes combining phase-shifted interferograms into an estimate of the amplitude and phase of the relay field. It also combines the relay fields sampled for various relative positions of the measurement and object planes into a single estimate of the scattering amplitude of the object. If off-axis holography is used, the computer can perform the Fourier analysis to infer the amplitude and phase of the relay field.

Mathematical Description of Instrument

A mathematical model of the instrument, as now described, allows the imaging procedures and algorithms needed to process and compute an image from the data to be understood. The following description is provided in terms of the quantities shown in FIG. 8.

For purposes of this analysis, it is assumed, without loss of generality, that all of the fields are time-harmonic, with a wave number of $k_0 = 2\pi/\lambda$. The electric field that illuminates the object is described by $E_i^\epsilon(r) = E_i^\epsilon \exp(ik_i \cdot r)$, describing a plane wave with transverse spatial frequency $k_i$ and polarization $\epsilon$. This field will be scattered by an object with the susceptibility $\eta(r)$. The field will propagate from the object plane to the diffractive plane with a space-invariant diffraction kernel dyadic given by $P(r'-r)$. The field will then scatter off of the diffractive, which has a susceptibility described by $\chi(r-r_d)$, and $r_d$ is the position of the diffractive element. The field after scattering from the diffractive, described by $E_D^{\epsilon}(r')$ which is the amplitude of the polarization component $\epsilon'$ at position $r'$ is:

$$E_D^{\epsilon'}(r') = \chi(r'-r_d) \int E_i^\epsilon \exp(ik_i \cdot r) \eta(r) P(r'-r) d^2 r \quad \text{(Eqn. 1)}$$

If we define the following Fourier transforms $$\tilde{E}_D^{\epsilon'}(k) = \int E_D^{\epsilon'}(r)\exp(ik\cdot r)d^2r \qquad \tilde{\chi}(k) = \int \chi(r)\exp(ik\cdot r)d^2r$$

$$\tilde{P}^{\epsilon\epsilon'}(k) = \frac{1}{k_z(k)}\left(\delta^{\epsilon\epsilon'} - \frac{k^\epsilon k^{\epsilon'}}{k_0^2}\right)\int P(r)\exp(ik\cdot r)d^2r \qquad \tilde{\eta}(k) = \int \eta(r)\exp(ik\cdot r)d^2r \qquad \text{(Eqn. 2)}$$

where $\tilde{P}^{\epsilon\epsilon'}(k)$ is the dyadic describing the propagation of polarization component $\epsilon$ to $\epsilon'$ for spatial frequency k. The symbol $\delta^{\epsilon\epsilon'}$ is the Kronecker delta function, and $k^\epsilon$ is the component of the spatial frequency in the direction $\epsilon$ where the components of $k^\epsilon$ parallel to the diffractive surface correspond to k, and the component perpendicular to the diffractive surface is such that $$\sum_\epsilon |k^\epsilon|^2 = k_0^2.$$

For brevity, we define $k_z(k)=\sqrt{k_0^2-|k|^2}$. Then $\tilde{E}_D^{\epsilon'}(k)$ simplifies to:

$$\tilde{E}_D^{\epsilon'}(k') = \qquad \text{(Eqn. 3)}$$
$$E_i^\epsilon(2\pi)^{-2}\int \tilde{\chi}(k'-k)\tilde{\eta}(k-k_i)\tilde{P}^{\epsilon\epsilon'}(k)\exp(i(k'-k)\cdot r_d)d^2k,$$

Next, the field is propagated from the diffractive plane to the focal plane through the telescope. The field at the focal plane will be $E_o^{\epsilon'}(r'')$, which is the amplitude of polarization component $\epsilon'$ at position r''. Since the system is telecentric, we define a function $L(r''/M-r')$ that is the space-invariant convolution kernel that relays the field with a magnification given by M. The field at the focal plane is given by:

$$E_o^{\epsilon'}(r'')=\int E_D^{\epsilon'}(r')L(r''/M-r')d^2r' \qquad \text{(Eqn. 4)}$$

If we again define the following Fourier transforms:

$$\tilde{E}_o^{\epsilon'}(k)=\int E_o^{\epsilon'}(r/M)\exp(ik\cdot r/M)d^2r \quad \tilde{L}(k)=\int L(r)\exp(ik\cdot r)d^2r \qquad \text{(Eqn. 5)}$$

Eqn. 4 can be simplified to:

$$\tilde{E}_o^{\epsilon'}(k'')=\tilde{E}_D^{\epsilon'}(k')\tilde{L}(k') \qquad \text{(Eqn. 6)}$$

Putting together Eqns. 3 and 6:

$$\tilde{E}_D^{\epsilon'}(k',r_d)=E_i^\epsilon(2\pi)^{-2}\tilde{L}(k')\int \tilde{\chi}(k'-k)\tilde{\eta}(k-k_i)\tilde{P}^{\epsilon\epsilon'}(k)\exp(i(k'-k)\cdot r_d)d^2k \qquad \text{(Eqn. 7)}$$

where we have explicitly indicated the dependence of $\tilde{E}_o^{\epsilon'}(k'')$ on $r_d$. We now take the Fourier transform of Eqn. 7 with respect to $r_d$ to find:

$$\tilde{E}_D^{\epsilon'}(k',k_d)=E_i^\epsilon \tilde{L}(k')\int \tilde{\chi}(k'-k)\tilde{\eta}(k-k_i)\tilde{P}^{\epsilon\epsilon'}(k)\delta(k'-k+k_d)d^2k \qquad \text{(Eqn. 8)}$$

Performing the integration, we find:

$$\tilde{E}_D^{\epsilon'}(k',k_d)=E_i^\epsilon \tilde{\chi}(-k_d)\tilde{\eta}(k'+k_d-k_i)\tilde{L}(k')\tilde{P}^{\epsilon\epsilon'}(k'+k_d) \qquad \text{(Eqn. 9)}$$

For simplicity, we define $k_\eta=k'+k_d-k_i$, which are the spatial frequencies in the object itself, and change variables to $k_\eta$ to find:

$$\tilde{E}_D^{\epsilon'}(k',k_\eta)=E_i^\epsilon \tilde{\chi}(k'-k_\eta-k_i)\tilde{\eta}(k_\eta)\tilde{P}^{\epsilon\epsilon'}(k_\eta+k_i)\tilde{L}(k') \qquad \text{(Eqn. 10)}$$

This equation relates spatial frequencies of the object with spatial frequencies in the measured field at the focal plane. We then define an operator $\hat{K}$ such that $$\tilde{E}_D^{\epsilon'}=\hat{K}\tilde{\eta}=\int[E_i^\epsilon \tilde{L}(k')\tilde{\chi}(k'-k-k_i)\tilde{P}^{\epsilon\epsilon'}(k+k_i)\delta(k-k_\eta)]\tilde{\eta}(k)d^2k \qquad \text{(Eqn. 11)}$$

where the quantity in brackets is the kernel of the operator $\hat{K}$. The adjoint operator $\hat{K}^*$ is then defined by:

$$\tilde{\eta}_A(s) = \hat{K}^* \tilde{E}_D^{\epsilon'} = \qquad \text{(Eqn. 12)}$$
$$\sum_{\epsilon\epsilon'}\int\int \left[E_i^{\epsilon*}\tilde{L}(k')^*\tilde{\chi}(k'-s-k_i)^*\tilde{P}^{\epsilon\epsilon'}(s+k_i)^*\delta(s-k_\eta)\right]$$
$$\tilde{E}_D^{\epsilon'}(k'-k_\eta)d^2k'd^2k_\eta$$

Note that we sum over all polarization states of $\epsilon$ and $\epsilon'$. We can combine Eqns. 11 and 12 to find the kernel of $\hat{K}^*\hat{K}$, the normal operator for the instrument:

$$\hat{K}^*\hat{K} = \qquad \text{(Eqn. 13)}$$
$$\delta(s-k)\sum_{\epsilon\epsilon'}|E_i^\epsilon|^2|\tilde{P}^{\epsilon\epsilon'}(k+k_i)|^2\int|\tilde{\chi}(k'-k-k_i)|^2|\tilde{L}(k')|^2 d^2k'$$

The operator $\hat{K}^*\hat{K}$ is diagonal in the Fourier basis of $\tilde{\eta}(k)$. This means that the operator $\hat{K}^*\hat{K}$ is a space-invariant convolution. The bandpass of $\hat{K}^*\hat{K}$ is the spatial frequencies of the susceptibility $\tilde{\eta}(k)$ that can be resolved. To see this, consider the Tikhonov regularized pseudoinverse estimate of $\tilde{\eta}'(k)=(\hat{K}^*\hat{K}+\Lambda I)^{-1}\hat{K}^*\tilde{E}_D^{\epsilon'}=(\hat{K}^*\hat{K}+\Lambda I)^{-1}\hat{K}^*\hat{K}\eta$, where $\Lambda$ is a regularization parameter determined by the amount of additive noise. Because $\hat{K}^*\hat{K}$ is a space-invariant convolution, the Tikhonov estimator will also be a space-invariant convolution.

To determine the bandpass of the instrument for a realistic instrument, we must find the functions $\tilde{\chi}(k)$, $\tilde{L}(k)$, and $\tilde{P}^{\epsilon\epsilon'}(k)$ that correspond to a specific physical situation. The function $\tilde{P}^{\epsilon\epsilon'}(k)$ is the propagation kernel between the object and the diffractive. If the object is uniform with a thickness $\Delta z$, and is a distance $z_0$ away from the diffractive $$\tilde{P}^{\epsilon\epsilon'}(k) = k_z(k)^{-1}\left(\delta^{\epsilon\epsilon'} - \frac{k^\epsilon k^{\epsilon'}}{k_0^2}\right)\int_{z_0}^{z_0+\Delta z}\exp(izk_z(k))dz \qquad \text{(Eqn. 14)}$$

If the telescope has a numerical aperture of N, the bandpass of the telescope $\tilde{L}(k)$ is given by $$\tilde{L}(k)=1 \text{ for } |k|<Nk_0, \tilde{L}(k)=0 \text{ otherwise.} \qquad \text{(Eqn. 15)}$$

The diffractive element will have a susceptibility $\tilde{\chi}(k)$ of a Fresnel zone plate. The chirp rate of the pattern will be $\alpha$, and the radius of the plate is w. The susceptibility of the plate is given by $$\chi(r) = \frac{\chi_0}{2}(1 + \cos(\pi\alpha|r|^2)) \text{ for } |r| < w, \qquad \text{(Eqn. 16)}$$

$$\chi(r) = 0 \text{ otherwise.}$$

Figure 8:
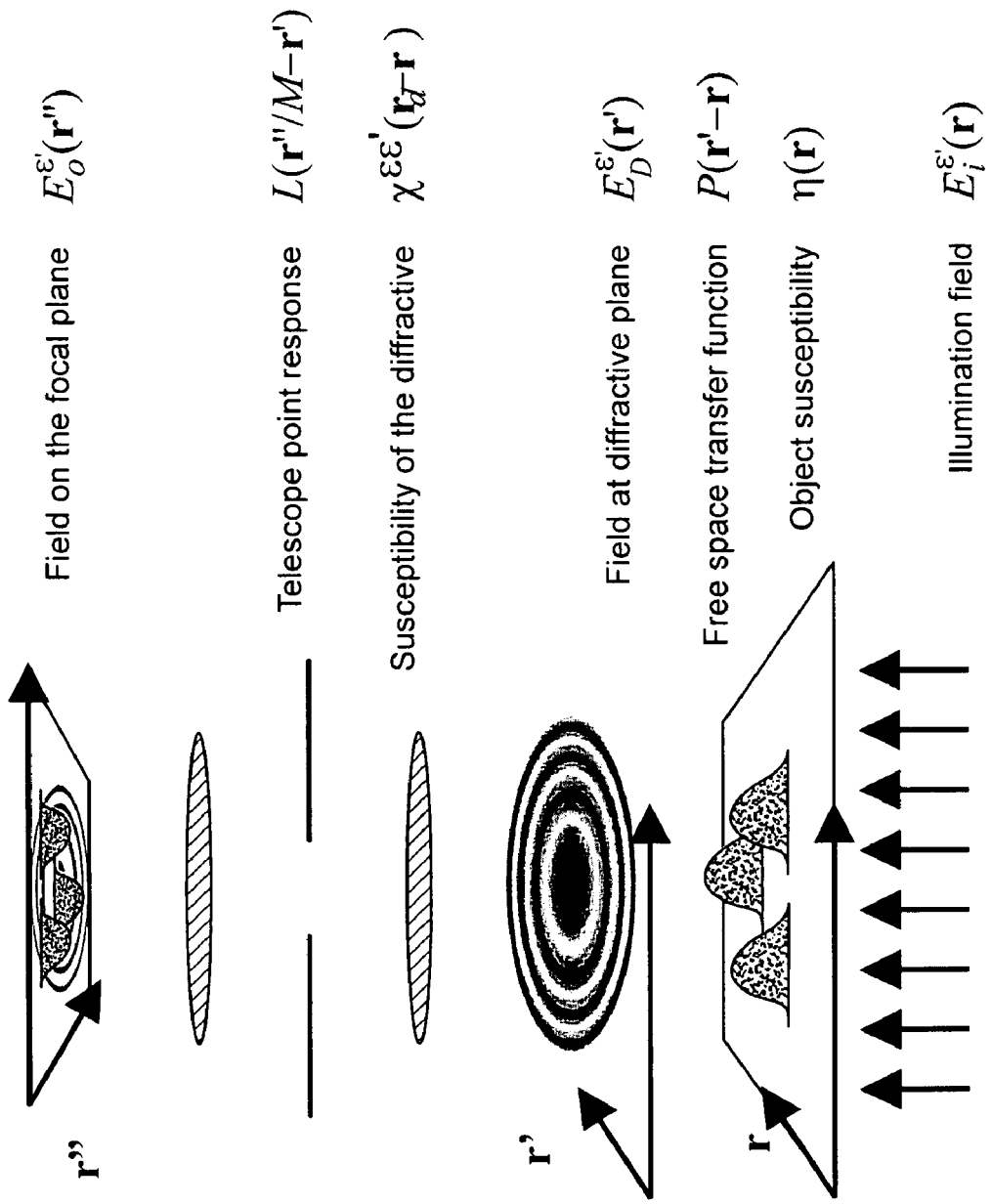
FIG. 8 shows variables and coordinates used in derivation of transfer function of the invention.

We now derive the conditions on the parameters of the optical system of FIG. 8 needed to ensure that is able to sample all of the spatial frequencies of an object up to a maximum spatial frequency $k_m$. The parameters of the diffractive element $\alpha$, the chirp rate of the Fresnel zone plate, and w the width of the Fresnel zone plate, are from Eqn. 16. The parameter $0<N<1$ is the numerical aperture of the telescope of FIG. 8, which is determined by the limiting stop in the pupil plane in the telescope, so that the maximum spatial frequency imaged through the telescope is $Nk_0$. This analysis assumes that $w>>1/\sqrt{\alpha}$, so that the Fresnel zone plate will have many concentric rings, and therefore acts more like a grating and less like a point probe.

The normal operator of Eqn. 13 determines the spatial frequencies that can be reconstructed by the system. The normal operator is a space-invariant convolution that determines the spatial frequencies measurable by the instrument. This is because it must be inverted to as part of the pseudo-inverse operator. In the spatial domain, it states that the normal operator of the imaging system is given by the product of the autocorrelations of the diffractive element and the free-space diffraction kernel in the spatial domain. In the frequency domain, this can be restated as the spatial frequency transfer function of the instrument is the convolution of the squared magnitudes of the Fourier transforms of the diffractive element and the free-space diffraction kernel. This can be seen by noting that the autocorrelation and Fourier squared magnitudes are Fourier conjugates, and that a product in the spatial domain becomes a convolution in the frequency domain.

To derive the bandpass of the optical system of FIG. 8, we compute the squared magnitudes of the spatial frequencies of the diffractive element and of the imaging telescope. The Fourier transform of the Fresnel zone-plate susceptibility $\tilde{\chi}(k)$ can be approximated by a similar Fresnel zone-plate pattern in the Fourier domain:

$$\tilde{\chi}(k) = \pi\delta(|k|^2) + \frac{1}{2\alpha}\cos\left(\frac{|k|^2}{4\pi\alpha}\right) \text{ for } |k| < 2\pi\alpha w, \qquad \text{(Eqn. 17)}$$

$$\tilde{\chi}(k) = 0 \text{ otherwise}$$

Because of the finite spatial frequency extent of the Fresnel zone-plate, the maximum spatial frequency grating in the plate is approximately $2\pi\alpha w$. On the other hand, the spatial frequency transfer function of the telescope $\tilde{L}(k)$ is given by the circular bandpass function (determined by the shape of the pupil) of Eqn. 15. To ensure that all spatial frequencies of the object up to $k_m$ are sampled, the convolution of $\tilde{\chi}(k)$ and $\tilde{L}(k)$ on the k-plane must fill the k-plane up to a radius $k_m$. A graphical depiction of this is given in FIG. 9, where (a) shows the magnitude of $\tilde{\chi}(k)$ near the origin. The convolution $|\tilde{\chi}(k)|^2 * |\tilde{L}(k)|^2$ must eliminate gaps in the k-plane where $\tilde{\chi}(k)$ is nearly zero. The largest gap in $\tilde{\chi}(k)$ is between the center circle and the first ring, and so this determines the maximum blurring the convolution must achieve to fully cover the k-plane. The function $\tilde{\chi}(k)$ equals 0 nearest the origin on the circle $|k|=\pi\sqrt{2\alpha}$. By convolving $|\tilde{\chi}(k)|^2$ with a circ function of radius $\pi\sqrt{2\alpha}$, the result of part (b) emerges.

This fairly uniformly covers the k-plane, filling the largest gap in $\tilde{\chi}(k)$. This convolution can be achieved by choosing the numerical aperture $N>\pi\sqrt{2\alpha}/k_0$. Because the numerical aperture cannot exceed one, this places an upper limit on the usable $\alpha<N^2k_0^2/2\pi^2$ when $N=1$.

To determine the maximum admitted spatial frequency of the instrument, we note that the maximum spatial frequency present in the Fresnel zone-plate is $2\pi\alpha w$. Because of the convolution with the telescope diffraction kernel, the maximum spatial frequency will be $k_m=2\pi\alpha w+Nk_0$. For a zone-plate of size w, this places a lower limit on $\alpha>(k_m-Nk_0)/2\pi w \approx k_m/2\pi w$. This places a minimum size on the diffractive of $w>\pi k_m/k_0^2 N^2$ when the upper and lower bound of $\alpha$ match. This condition corresponds to maximizing the amount of spatial bandwidth measured in each diffraction-limited resolvable spot on the zone-plate through the telescope.

Finally, since the field at the focal plane sensor is bandlimited by the finite numerical aperture of the telescope, we note that it suffices to sample the field at the Nyquist rate to reconstruct it using the Shannon sampling theorem. This rate in the sensor plane will be $\Delta r_f<\pi M/k_0 N$, where M is the magnification of the telescope. One may also consider what the sampling criteria is for the minimum spacing $\Delta r_d$ of the sampled positions of the diffractive element $r_d$. Translating the diffractive by $\Delta r_d$ shifts the local grating spatial frequency by $\alpha\Delta r_d$. To ensure that the Fourier space is sufficiently tiled, the sampled areas of the Fourier space should differ by no more than the bandlimit of the optical system $\alpha\Delta r_d<Nk_0$, so that $\Delta r_d<Nk_0/\alpha$. For the maximum $\alpha=N^2k_0^2/2\pi^2$, the minimum step size of the diffractive $\Delta r_d=\pi/k_0 N$, or the minimum resolvable feature size of the telescope on the diffractive.

In practice, it is possible that the diffractive may scatter light back towards the object. This light can be scattered again by the object, contributing to multiple scattering effects. To partially account for the reflections of the surface on which the object rests and the surface of the diffractive, we can find the field at the object surface when the reflections have been accounted for. This situation is illustrated in FIG. 10. Light 101 incident on the object 52 scatters from the object. The diffractive 53 will scatter some of the light into the telescope, but some of the light will be reflected by the surface of the diffractive back toward the object. This light will reflect off of the object surface and back toward the diffractive again. The ratio of the field amplitude of a transverse Fourier component k at the diffractive surface to the field at the object surface is given by Eqn. 3 with $$\tilde{p}^{\varepsilon\varepsilon'}(k) = k_z(k)^{-1}\left(\delta^{\varepsilon\varepsilon'} - \frac{k^\varepsilon k^{\varepsilon'}}{k_0^2}\right)\frac{\exp(izk_z(k))T_{23}}{1+R_{12}R_{23}\exp(2izk_z(k))}, \qquad \text{(Eqn. 18)}$$

where z is the gap between the object plane and diffractive plane, $n_1$ is the refractive index of the object surface, $n_2$ is the refractive index of the gap between the object and diffractive, and $n_3$ is the refractive index of the diffractive. For TE incident polarization, the Fresnel coefficients $R_{ij}$ and $T_{ij}$ for a wave of transverse wave number k traveling between the surfaces i and j are given by:

$$R_{ij}(k) = \frac{\sqrt{n_i^2 k_0^2 - |k|^2} - \sqrt{n_j^2 k_0^2 - |k|^2}}{\sqrt{n_i^2 k_0^2 - |k|^2} + \sqrt{n_j^2 k_0^2 - |k|^2}} \text{ and } T_{ij} = 1 + R_{ij} \qquad \text{(Eqn. 19)}$$

For TM incident polarization, the Fresnel coefficients are:

$$R_{ij}(k) = \frac{n_j^2\sqrt{n_i^2 k_0^2 - |k|^2} - n_i^2\sqrt{n_j^2 k_0^2 - |k|^2}}{n_j^2\sqrt{n_i^2 k_0^2 - |k|^2} + n_i^2\sqrt{n_j^2 k_0^2 - |k|^2}} \text{ and } T_{ij} = 1 + R_{ij} \quad \text{(Eqn. 20)}$$

where n is the index of refraction of the medium containing the diffractive. By using the $\tilde{P}^{\epsilon\epsilon'}(k)$ of Eqn. 18 rather than that of Eqn. 14, the multiple reflections or "etalon" effects in the gap between the object and diffractive can be compensated.

Image Acquisition and Processing

With the mathematical description of the instrument as heretofore discussed, we now describe how to acquire and process data for this instrument. First, the resolution of the instrument is $k_m$. Then one should determine the extent of the object that will be imaged with the instrument. In general, the greatest improvement in signal-to-noise ratio will occur if the radius w of the diffractive is sufficient to the diffractive just covers the entire object being imaged, but not significantly more than that. The chirp rate of the diffractive will then be $\alpha = k_m/2\pi w$ to ensure all desired frequencies are sampled from the entire object. The numerical aperture N of the instrument will need to be such that $\alpha < N^2 k_0^2/2\pi^2$ or otherwise the radius w will need to be increased until that is the case.

For two-dimensional data acquisition, the gap between the object and the diffractive should be held constant. The object normally will be illuminated from below with an evanescent wave. The diffractive should be stepped in the horizontal and vertical directions in increments of $\Delta r_d$ such that $\Delta r_d < Nk_0/\alpha$ to ensure that all frequencies are sampled from all parts of the object. At each step, the field on the focal plane array will be sampled by changing the relative phase between the reference and relayed fields to measure only the interference component between the fields. The interference between the two fields can be described as:

$$|E_{tot}(x,y)|^2 = |E_{ref}(x,y) + E_{relay}(x,y)|^2 = |E_{ref}(x,y)|^2 + |E_{relay}(x,y)|^2 + 2Re\{E_{ref}(x,y)E_{relay}(x,y)^*\} = |E_{ref}(x,y)|^2 + |E_{relay}(x,y)|^2 + 2|E_{ref}(x,y)||E_{relay}(x,y)|\cos\phi \quad \text{(Eqn. 21)}$$

where $E_{tot}(x, y)$ is the total electric field of both reference and relay fields superimposed, $E_{ref}(x, y)$ is the reference electric field, and $E_{relay}(x, y)$ is the relayed electric field. By changing the relative phase between the two fields $\phi$, the field $E_{relay}(x, y)$ can be determined by measuring the intensity $|E_{tot}(x, y)|^2$ on the focal plane for three or more values of $\phi$. This method of phase shifting to find the amplitude and phase of an electric field is well known. Alternatively, there may be an angle introduced between the reference and relayed fields, to implement an off-axis hologram method similar to the Leith-Upatnieks hologram. By using Fourier analysis to the total interference pattern, the amplitude and phase of the relay field can be inferred. This has the benefit of eliminating the need for phase shifting.

The diffractive must be moved over the entire object such that each point on the object is sampled at least once by each patch on the diffractive of area $\Delta r_d$ by $\Delta r_d$, typically meaning that approximately $(w/\Delta r_d)^2$ fields will need to be sampled. For example, if the object and diffractive have an extent of 5 μm, and the step size is 0.25 μm, then the number of sampled fields will be approximately 400. Each of these fields compromises the samples of the electric field $\tilde{E}_D^{\epsilon}(r',r_d)$ where r' is the position on the focal plane array, and $r_d$ is the position of the diffractive. By using this function $\tilde{E}_D^{\epsilon}(r',r_d)$ we will infer the susceptibility $\tilde{\eta}(k)$.

To use this information to infer $\tilde{\eta}(k)$, we first define a forward and adjoint operator that account for the finite sampling of r' and $r_d$.

$$E_o^{\epsilon'}(r'', r_d) = K\eta(r) \quad \text{(Eqn. 22)}$$

$$= \sum_{r'} \chi(r' - r_d) \left[ \sum_r E_i^{\epsilon} \exp(ik_i \cdot r)\eta(r) P(r' - r) \right]$$

$$L(r''/M - r')$$

$$\eta_A(s) = K^* E_o^{\epsilon'}(r'')$$

$$= \sum_{\epsilon\epsilon'} \sum_{r',r_d} E_i^{\epsilon} \exp(-ik_1 \cdot s) P(r' - s) * \chi(r' - r_d) *$$

$$\left[ \sum_{r''} L(r''/M - r') * E_o^{\epsilon'}(r'', r_d) \right]$$

where the sums over r, r', r'', and $r_d$ are taken to be over all available points of the respective variables, and all polarization states of $\epsilon$ and $\epsilon'$. The sums over r, r', and r'' are convolutions that can be performed efficiently using the Fast Fourier Transform on a uniformly spaced grid. Using these operators, we can define a Tikhonov-regularized least squares solution for $\tilde{\eta}(k)$, $\tilde{\eta}'(k) = (\hat{K}^*\hat{K} + \Lambda I)^{-1}\hat{K}^*\tilde{E}_D^{\epsilon'}$. In practice, such systems may be solved efficiently by using the conjugate gradient method or other sparse matrix methods. To do so, first compute the object data function $\tilde{\eta}_A(s) = \hat{K}^*\tilde{E}_D^{\epsilon'}$, so that $\tilde{\eta}'(k) = (\hat{K}^*\hat{K} + \Lambda I)^{-1}\tilde{\eta}_A$. Then the conjugate gradient method need only invert the positive-definite operator $\hat{K}^*\hat{K} + \Lambda I$. To speed up such methods, a good approximation to $\hat{K}^*\hat{K} + \Lambda I$ called a preconditioner is desirable. A good approximation to $\hat{K}^*\hat{K}$ is given by Eqn. 13, which is the operator for the continuously sampled case. In the continuously sampled case, the operator $\hat{K}^*\hat{K}$ is diagonal in Fourier space. Therefore the inverse of the operator is straightforward to apply to each Fourier component.

Implementation of Instrument With Hadamard-Walsh Coded Diffractives

An alternative embodiment of the invention uses a diffractive that instead of containing one large pattern like a single Fresnel zone plate, contains many small separate patterns on a diffractive element. These patterns are located far enough away from each other so that they are individually resolvable on the focal plane, which means they must be spaced apart by at least $2\pi/Nk_0$ distance. Between the patterns, the diffractive will either block or pass all light (there will be no features encoded into the region between the patterns). The advantage of the scheme is a simplification of the data acquisition and data reduction, at the expense of some signal. Because the invention can be expected to greatly increase the signal-to-noise ratio over a scanning probe, the slight reduction in SNR is usually well tolerated.

When one single large diffractive pattern is used, every sample in the image is dependent somewhat on every data point. If a data point is noisy it may degrade the entire image somewhat, and using all of the data to find the image may be a slow computational process. By using several distinct patterns on the same diffractive, the object space may be broken into sub-regions, where the data is measured so that no pattern will simultaneously cover areas in two or more sub-regions. Therefore each data point will be determined only by one sub-region. To reconstruct an image of a sub-region, one needs only use the data that is determined by that sub-region, and ignore all other data. If the object space is broken into many sub-regions, this can result in a significant reduction in computational effort and complexity.

A diagram of such a diffractive 110 is provided in FIG. 11. On this diffractive, there are several discrete, separated patterns written into a rectangular grid. The pattern is inverted so that white area indicates the area where the light is blocked, and the black area is where it passes through. In this case, the pattern is a binary blocked/unblocked structure so that gray levels do not need to be fabricated onto the diffractive.

Alternatively, a phase diffractive could be used where the white areas indicate where the diffractive does not scatter, and the black areas where the diffractive does scatter. The patterns on the diffractives are called two-dimensional Hadamard-Walsh (HW) codes. HW codes are binary orthogonal codes that take on the values −1 or 1. The inverse of the HW code is itself a HW transformation, because the transpose of an orthonormal transformation is its inverse.

The data acquisition by an instrument using HW coded diffractives operates similarly to the case of the Fresnel diffractive. The HW diffractive is placed in the near-field of the object, and the field scattered by the diffractive is sensed in the far-field at the focal plane using interferometry. The sub-regions of the object will correspond to a rectangular lattice of regions with the period of the lattice corresponding to the period of the patterns on the diffractive. By displacing the pattern horizontally and/or vertically by only an integer number of patterns, one can ensure that no pattern will cover two sub-regions, because the sub-regions will exactly overlap with the patterns. The data acquisition will be rapid because the data corresponding to many patterns overlapping many sub-regions can be measured simultaneously. The field received at the focal plane array contains the projections of many patterns onto many sub-regions.

To find the estimate of the susceptibility $\eta(r)$, one can use the operators of Eqn. 22 and the least-squares solution. The displacements $r_d$ will correspond to the positions of the diffractive over the surface when data is taken. In addition, because the sub-regions can be reconstructed separately, the sums over r, r', and r" may be restricted to summing over only those points in the sub-regions that contribute to the corresponding data and image.

Simulation

To demonstrate the ability of the invention to resolve sub-wavelength features, a simulation was constructed of the experimental apparatus including a diffractive, a resolution target, and the process of data acquisition and reconstruction. The diffractive was a Fresnel zone plate, with a radius of 4 wavelengths ($4\lambda$) and a maximum spatial frequency of 4 inverse wavelengths ($4\lambda^{-1}$), corresponding to a resolution four times the conventional Abbe-Rayleigh diffraction limit of one inverse wavelength. The simulated wavelength was 632 nm, corresponding to the wavelength of a Helium-Neon laser. The test resolution target was also a diffractive object of radius $4\lambda$ and a maximum spatial frequency of $6\lambda^{-1}$. The spatial frequency of the target increased linearly with distance from the center of the target. Because the diffractive object contains less spatial frequency bandwidth than the target, it is not expected to resolve the finest features in the target. This loss of detail was simulated by design to test the accuracy of the simulation.

Figure 12:
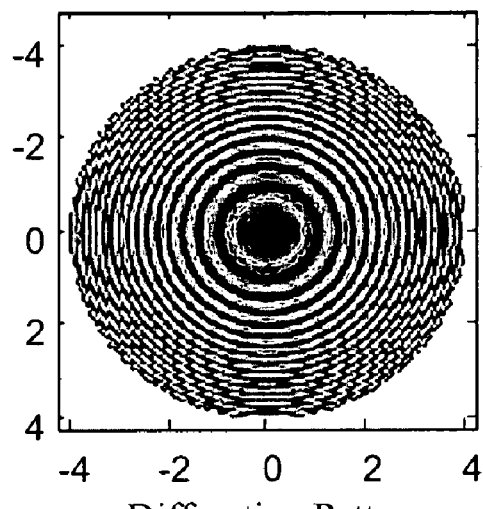
FIG. 12 shows simulated data and the reconstruction of an image of the object by a Near-Field Multiplex Diffractive Instrument in accordance with the invention. All dimensions are in wavelengths. Upper left: diffractive pattern used in measurement plane. Upper right: scattering susceptibility pattern of object, a resolution test target. Lower left: the reconstruction using the "slow" method where all possible data is acquired. Right: the reconstruction using the "fast" method where only a sparse data set is acquired.
Figure 12:
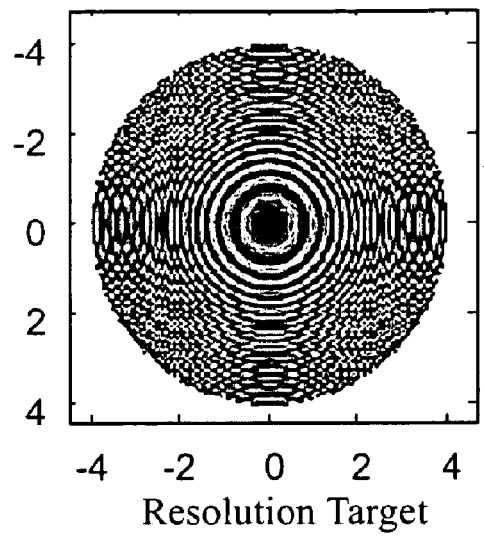
Figure 12:
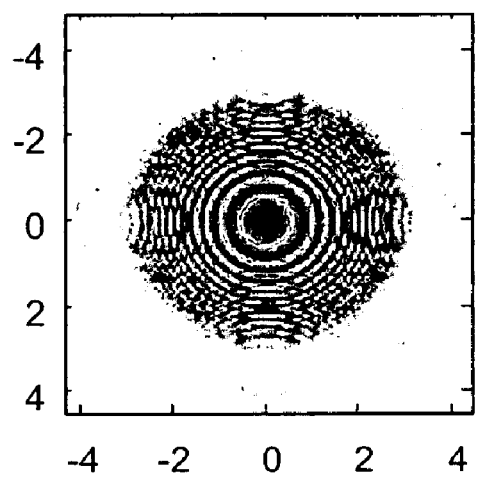
Figure 12:
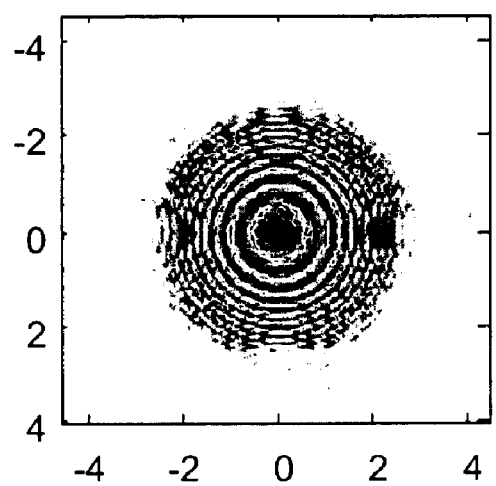

Two simulations were performed. One was the "slow acquisition" mode where it is assumed that the data is available for all relative positions of the measurement and object planes. This corresponded to a sampling rate of relative positions of $\lambda/16$. The other was the "fast acquisition" mode, where only a partial subset of the data is available with relative positions sampled at a rate of $\lambda/4$. This represents a data acquisition time savings of approximately 250 times. FIG. 12 shows the results of the simulation. The upper left image is the diffractive pattern used in the measurement plane, and the upper right is the diffractive pattern used in the resolution target. The reconstruction using the slow acquisition is shown in the lower left corner, while the reconstruction using the fast acquisition is shown in the lower right corner. While there is a slight loss of fidelity due to the rapid acquisition, the great increase in speed will make metrology applications practical that would otherwise take far too long using a scanning probe.

Figure 13:
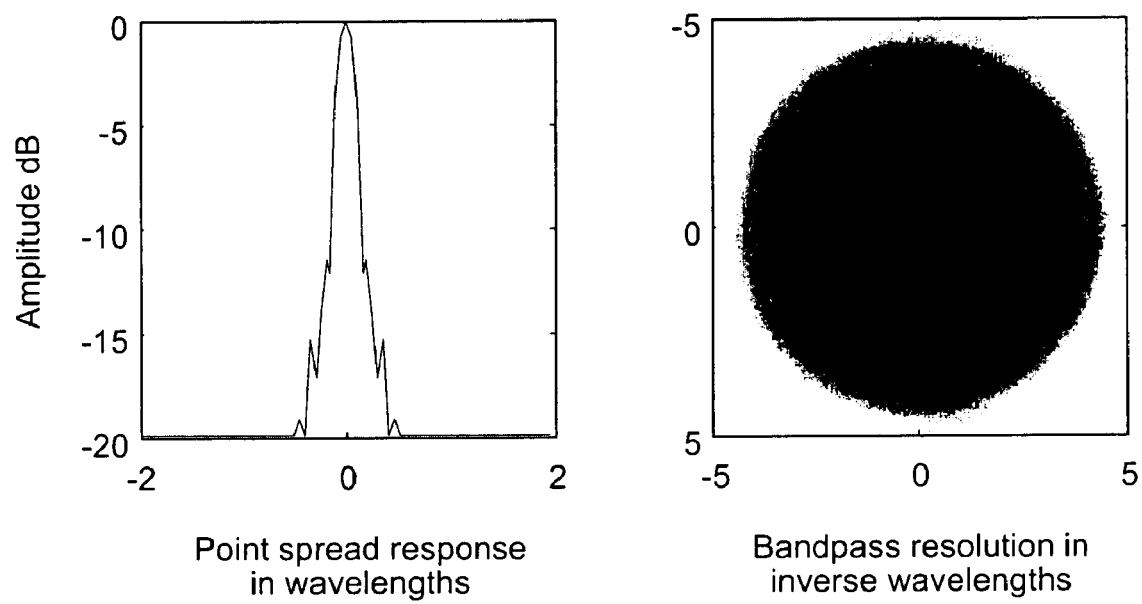
FIG. 13 shows the point spread response, on the left (on a logarithmic scale), of the near-field optical system, and the corresponding bandpass function, on the right, for a 20 dB signal-to-noise ratio.

As a second check of the resolution of the instrument, the point response of the instrument was computed. FIG. 13 shows the point response of the instrument on the left, corresponding to a −3 dB point response width of $0.2\lambda$. The corresponding bandpass of the instrument, as shown on the right, corresponds to $4\lambda^{-1}$, as predicted from the pattern of the measurement diffractive mask. This simulation confirms the ability of the instrument to produce an accurate reconstruction from sparse data, thereby advantageously speeding up image acquisition.

The improvement in resolution and speed provided by this instrument may advantageously facilitate the study subwavelength structures in the biological sciences without subjecting them to ionizing radiation or vacuum, and provide a non-contact metrology device for surfaces in nanotechnology.

The embodiments of the invention heretofore described are intended to be merely exemplary and numerous variations and modifications will be apparent to those skilled in the art. An example of such a modification is the inversion of the optical path such that the illuminating radiation traverses the diffractive prior to illuminating the object to be imaged. All such variations and modifications are intended to be within the scope of the present invention as defined in any appended claims.

What is claimed is:

1. A method for imaging an object, the method comprising:
   a. illuminating the object with a substantially coherent beam of electromagnetic radiation, the coherent beam characterized by a wavelength;
   b. interposing a diffracting medium in the near field of the object, the diffracting medium for diffracting said electromagnetic radiation illuminating the object including scattering evanescent waves in the near field, the diffracting medium characterized by a structure of scale length varying with position;
   c. transferring the electromagnetic radiation diffracted by said diffracting medium to form a convolution image at least partially from the evanescent waves scattered with the diffracting medium substantially at a focal plane;
   d. detecting the convolution image; and
   e. deconvolving the convolution image with respect to the structure of the diffracting medium for obtaining an image of the object.

2. A method in accordance with claim 1, further comprising:
   f. interfering the electromagnetic radiation, having been diffracted by the diffracting medium and having interacted with the object, with a reference beam of electromagnetic radiation, such that the convolution image is an interferogram image containing phase information.

3. A method in accordance with claim 2, further including a step of detecting the interferogram image by means of an optical detector.

4. A method in accordance with claim 2, wherein the step of interfering includes incorporating the illuminating coherent beam into one arm of a Mach Zehnder interferometer.

5. A method in accordance with claim 1, wherein the electromagnetic radiation is selected from the group of visible radiation and infrared radiation.

6. The method of claim 1, wherein the coherent beam of electromagnetic radiation has a wavelength, and the image includes one or more features sized less than one-half of the wavelength of the electromagnetic radiation, the one or more features being determined from the envanescent waves scattered with the diffracting medium.

7. The method of claim 1, wherein said object is illuminated through said diffracting medium.

8. The method of claim 1, wherein said object is provided on a transparent surface, wherein said object is illuminated through said transparent surface.

9. The method of claim 1, wherein said object is illuminated using an evanescent wave.

10. The method of claim 1, wherein said object is provided on a prism, said method further comprising illuminating said prism such that said beam is incident on an inner surface of said prism at greater than the angle of total internal reflection.

11. The method of claim 1, wherein said diffracting medium is a diffraction grating.

12. The method of claim 1, wherein said diffracting medium is a transmission grating.

13. The method of claim 1, wherein said diffracting medium is a radially symmetric diffraction grating having a center and spatial frequencies that increase with distance from the center of the radially symmetric diffraction grating.

14. The method of claim 1, wherein said diffracting medium is a Fresnel zone plate.

15. The method of claim 1, wherein said diffracting medium includes a patterned surface.

16. The method of claim 15, wherein said patterned surface is a nanopatterned surface.

17. The method of claim 15, wherein said patterned surface has a two dimensional pattern including a range of spatial frequencies.

18. The method of claim 15, wherein said patterned surface includes one or more single frequency diffraction gratings, gratings with a linearly increasing frequency, Fresnel zones plates, binary two-dimensional orthogonal Hadamard-Walsh codes, or any combination thereof.

19. The method of claim 1, wherein said substantially coherent beam of electromagnetic radiation is characterized by a wavelength, wherein said diffracting medium is at a sub-wavelength distance from the object.

20. A near field microscope comprising:
a. a source of substantially coherent illumination for illuminating an object, wherein said coherent illumination has a wavelength;
b. a diffractive element characterized by a pattern of spatial frequency varying with position, the diffractive element disposed within a near field of the object;
c. a field relay telescope for relaying a field scattered by the diffractive element to a focal plane, wherein the field scattered by the diffractive element includes evanescent waves;
d. a focal plane sensor for measuring the field scattered by the diffractive element; and
e. a processor for deconvolving the field measured by the focal plane sensor to recover an image of the object at least partially from the evanescent waves scattered with the diffracting medium.

21. A near field microscope in accordance with claim 20, wherein the source of substantially coherent illumination includes a laser.

22. A near field microscope in accordance with claim 20, wherein the diffractive element is a transmission grating.

23. A near field microscope in accordance with claim 22, wherein the diffractive element is a transmission grating characterized by a plurality of distinct spatial frequencies.

24. A near field microscope in accordance with claim 22, wherein the diffractive element is characterized by radial symmetry.

25. A near field microscope in accordance with claim 22, wherein the diffractive element is a Fresnel zone plate.

26. A near field microscope in accordance with claim 22, wherein the diffractive element includes a patterned surface.

27. The near field microscope of claim 26, wherein said patterned surface is a nanopatterned surface.

28. The near field microscope of claim 26, wherein said patterned surface has a two dimensional pattern including a range of spatial frequencies.

29. The near field microscope of claim 26, wherein said patterned surface includes one or more single frequency diffraction gratings, gratings with a linearly increasing frequency, Fresnel zones plates, binary two-dimensional orthogonal Hadamard-Walsh codes, or any combination thereof.

30. The near field microscope of claim 20, wherein said diffractive element is at a sub-wavelength distance from the object.

31. A near field microscope in accordance with claim 20, wherein the field relay telescope includes a first lens of high numerical aperture.

32. A near field microscope in accordance with claim 20, wherein the field relay telescope includes a second lens of long focal length.

33. The microscope of claim 20, wherein the image includes one or more features having less than one-half the wavelength provided from the envanescent waves of the field scattered by the diffractive element.

34. The near field microscope of claim 20, wherein said object is illuminated through said diffractive element.

35. The near field microscope of claim 20, wherein said object is provided on a transparent surface, wherein said object is illuminated through said transparent surface.

36. The near field microscope of claim 20, wherein said object is illuminated using an evanescent wave.

37. The near field microscope of claim 20, wherein said object is provided on a prism, wherein a beam of said substantially coherent illumination from said source is incident on an inner surface of said prism at greater than the angle of total internal reflection.

38. The near field microscope of claim 20, wherein said diffractive element is a diffraction grating.

39. The near field microscope of claim 20, wherein said diffractive element is a radially symmetric diffraction grating having a center and spatial frequencies that increase with distance from the center of the radially symmetric diffraction grating.

40. The near field microscope of claim 20, wherein said source of substantially coherent illumination is a Helium-Neon or a diode laser.

41. The near field microscope of claim 20, wherein said source of substantially coherent illumination illuminates the object with electromagnetic radiation having wavelengths selected over the range of 400-2000 nm.

42. A method, comprising:

illuminating an object with a generally coherent beam of electromagnetic radiation having a wavelength, the coherent beam characterized by an optical path;

diffracting an illumination response of the object with an element in a near field of the object to couple an envanescent wave response of the object to a propagating wave response of the object; and providing an image of one or more features of the object having a size of less than one-half the wavelength from the envanescent wave response.

43. The method of claim 42, wherein the electromagnetic radiation is selected from the group of visible and infrared radiation and the providing of the image includes interfering with the illumination response with a reference beam to provide an interferogram representation containing phase information.

* * * * *